United States Patent
Yeh

(10) Patent No.: US 9,268,688 B2
(45) Date of Patent: Feb. 23, 2016

(54) DATA MANAGEMENT METHOD, MEMORY CONTROLLER AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 14/583,107

(22) Filed: Dec. 25, 2014

(65) Prior Publication Data

US 2015/0113358 A1    Apr. 23, 2015

Related U.S. Application Data

(63) Continuation of application No. 13/006,443, filed on Jan. 14, 2011, now Pat. No. 8,966,157.

(30) Foreign Application Priority Data

Dec. 16, 2010    (TW) ................................ 99144310 A

(51) Int. Cl.
| | |
|---|---|
| *G06F 12/00* | (2006.01) |
| *G06F 13/00* | (2006.01) |
| *G06F 12/02* | (2006.01) |
| *G06F 11/10* | (2006.01) |

(52) U.S. Cl.
CPC ........ *G06F 12/0246* (2013.01); *G06F 11/1068* (2013.01); *G06F 2212/7201* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 2009/0248961 A1* | 10/2009 | Chu et al. ...................... | 711/103 |
| 2010/0293321 A1* | 11/2010 | Weingarten ................... | 711/103 |
| 2011/0072199 A1* | 3/2011 | Reiter et al. .................. | 711/103 |

* cited by examiner

*Primary Examiner* — Sean D Rossiter
(74) *Attorney, Agent, or Firm* — Jianq Chyun IP Office

(57) ABSTRACT

A data management method, a memory controller and a memory storage apparatus are provided. The method includes grouping a plurality of physical units of a rewritable non-volatile memory module into at least a data area and a free area. The method also includes configuring a plurality of logical units for mapping a part of the physical units. The method further includes receiving at least two pieces of update data, which are corresponding to different logical pages of the logical units. The method further includes getting a physical unit from the physical units. The method further includes writing the at least two pieces of update data into the same one physical page of the gotten physical unit. Accordingly, the use efficiency of the physical units could be improved.

20 Claims, 20 Drawing Sheets

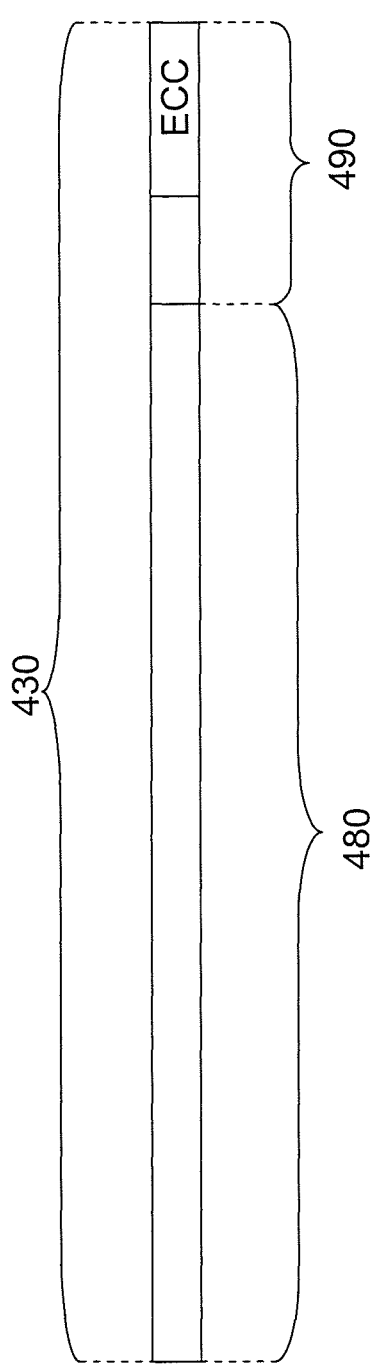
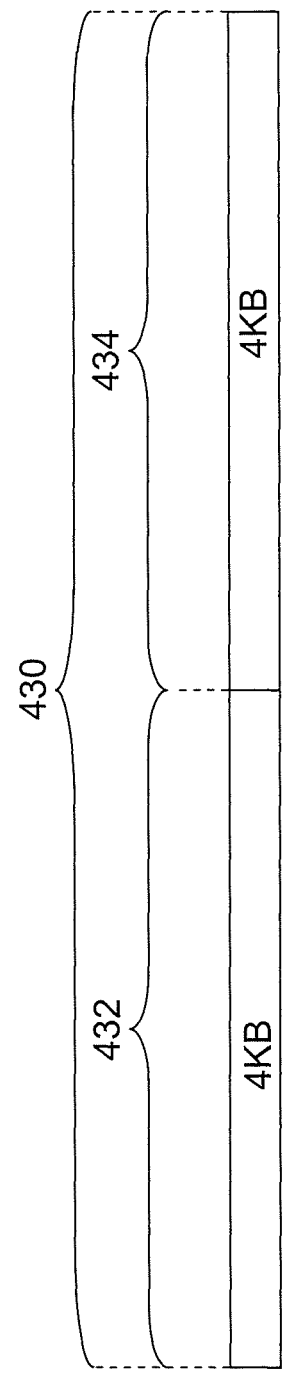
FIG. 4B
FIG. 4C

DATA MANAGEMENT METHOD, MEMORY CONTROLLER AND MEMORY STORAGE APPARATUS

CROSS-REFERENCE TO RELATED APPLICATION

This application is a continuation application of and claims the priority benefit of a prior application Ser. No. 13/006,443, filed on Jan. 14, 2011, now pending. The prior application Ser. No. 13/006,443 claims the priority benefit of Taiwan application serial no. 99144310, filed on Dec. 16, 2010. The entirety of each of the above-mentioned patent applications is hereby incorporated by reference herein and made a part of this specification.

BACKGROUND

1. Technology Field

The present invention relates to a data management method and particularly to a management method for data written in a physical block of a rewritable non-volatile memory module and a memory controller and a memory storage apparatus using the same.

2. Description of Related Art

Digital cameras, cells phones, and MP3 players have undergone rapid growth in recent years. Thus, consumer demand for storage media has also rapidly increased. Rewritable non-volatile memory is one of the most adaptable memories for battery-powered portable products such as laptop computers due to its characteristics such as data non-volatility, low power consumption, small volume, non-mechanical structure, and high read and write speed. A solid state drive (SSD) is a storage apparatus adopting flash memory as storage medium. Therefore, the flash memory industry has become a very important part of the electronic industry in recent years.

A memory sub-module of a flash memory module has a plurality of physical units. Each physical unit is formed from one or more physical blocks, and each physical block has a plurality of physical pages, wherein data must be written into a physical block according to the sequence of the physical pages in the physical block. Additionally, a physical page with data has to be erased before data is written into again. In particular, the smallest unit for erasing data is one physical block, and the smallest unit for programming (also referred to writing) data is one physical page. Therefore, in the management of the flash memory module, the physical units are grouped into a data area and a free area.

The physical units of the data area are used for storing data written by the host system. To be specific, a memory management circuit converts the logical access addresses accessed by the host system into logical pages of logical units, and maps the logical pages of the logical units to the physical pages of the physical units of the data area. Namely, in the management of the flash memory module, the physical units of the data area are regarded as used physical units (i.e. data from the host system is already stored). For example, the memory management circuit will use a logical unit-physical unit mapping table to record a mapping relationship between the logical units and the physical units of the data area, wherein the logical pages of the logical units are sequentially corresponding to the mapped physical pages of the physical units.

The physical units of the free area are used for substituting the physical units of the data area. Specifically, as described above, the written data of the physical blocks must be erased before it can write data again. Thus, the physical units of the free area are designed to write update data to substitute the physical units that map the logical units. Hence, the physical units in the free area are either blank or available units (i.e., no data is recorded in these units or data recorded in these units is marked as invalid data).

In other words, the physical pages of the physical units in the data area and the free area are alternatively used to map the logical pages of the logical units, to store data written by the host system. For example, the memory management circuit of a storage apparatus will get one or more physical units from the free area to be a substituted physical unit, and when the host system desires to write the update data into the logical access address corresponding to a logical page of a logical unit, the memory management circuit of the storage apparatus will write the update data in the physical page of the substituted physical unit.

In addition, the memory management circuit will mark the physical pages originally mapped to the logical pages written by the host system as invalid. In particular, if the amount of useful physical units in the free area is less than a preset threshold value, when executing writing commands, the memory management circuit must proceed with data merging, to avoid exhausting the physical units of the free area. Specifically, in the data merging process, the memory management circuit will get an empty physical unit from the free area, and copy valid data belonging to the same logical unit among the physical unit of the substituted physical unit and the data area to the gotten physical unit. From this, the substituted physical unit and the physical units of the data area stored the invalid data can be erased and associated to the free area.

With the progress of process of the flash memory, the capacity of each physical page in the physical blocks becomes larger. Take a conventional flash memory for example, the capacity of one of physical pages is 8 kilobytes (KB). However, the unit of the data written by the host system to the storage apparatus is usually 4 kilobytes, such that when the host system writes data of 4 kilobytes into a physical page of 8 kilobytes, the rest 4 kilobytes of the physical page are not used. Therefore, the capacity of the physical unit will be wasted.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a data management method, a memory controller, and a memory storage apparatus, which can writing two pieces of data corresponding to different logical access addresses into an identical physical page to improve the use efficiency of capacity of the physical units.

The exemplary embodiment of the present invention provides a data management method, for managing data written into a rewritable non-volatile memory module by a host system, wherein the rewritable non-volatile memory module includes a plurality of physical units, and each of the physical units includes a plurality of physical pages. The data management method includes configuring a plurality of logical units for mapping a part of the physical units. The data management method also includes building a logical unit-physical unit mapping table to record a mapping relationship between the logical units and the part of the physical units. The data management method further includes receiving at least two pieces of update data, which are corresponding to different logical pages among the logical pages. The data management method further includes getting a physical unit from the physical units. The data management method also includes writing the at least two pieces of update data into an identical physical page of the gotten physical unit.

The exemplary embodiment of the present invention provides a memory controller, for managing a rewritable non-volatile memory module, wherein the rewritable non-volatile memory module includes a plurality of physical units, and each of the physical units comprises a plurality of physical pages. The memory controller includes a host interface, a memory interface and a memory management circuit. The memory interface is configured to couple to a host system, and the memory interface is configured to couple to the rewritable non-volatile memory module. The memory management circuit is coupled to the host interface and the memory interface, and configured for configuring a plurality of logical units to map a part of the physical units and building a logical unit-physical unit mapping table to record a mapping relationship between the logical units and the part of the physical units. Each of the logical units has a plurality of logical pages. The memory management circuit is further used for receiving at least two pieces of update data, wherein the at least two pieces of update data are corresponding to different logical pages among the logical pages. The memory management circuit is further used for getting a physical unit from the physical units. The memory management circuit is further used for writing the at least two pieces of update data into an identical physical page of the gotten physical unit.

The exemplary embodiment of the present invention provides a memory storage apparatus. The memory storage apparatus includes a connector, a rewritable non-volatile memory module, and a memory controller. The rewritable non-volatile memory module has a plurality of physical units. The memory controller is coupled to the connector and the rewritable non-volatile memory module, and configured for configuring a plurality of logical units to map a part of the physical units and building a logical unit-physical unit mapping table to record a mapping relationship between the logical units and the part of the physical units. Each of the logical units has a plurality of logical pages. The memory controller is further used for receiving at least two pieces of update data, wherein the at least two pieces of update data are corresponding to different logical pages among the logical pages. The memory controller is further used for getting a physical unit from the physical units. The memory controller is further used for writing the at least two pieces of update data into an identical physical page of the gotten physical unit.

Based on the above, the exemplary embodiments of the present invention are capable of writing two pieces of data corresponding to different logical access addresses into an identical physical page, such that the use efficiency of capacity of the physical units could be improved.

In order to make the aforementioned and other features and advantages of the invention more comprehensible, embodiments accompanying figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 4B is a diagram illustrating an example of a physical page of a physical block according to the first embodiment of the present invention.

FIG. 4C is a diagram illustrating an example of a physical page of a physical block according to another embodiment of the present invention.

DESCRIPTION OF EMBODIMENTS

Figure 1A:
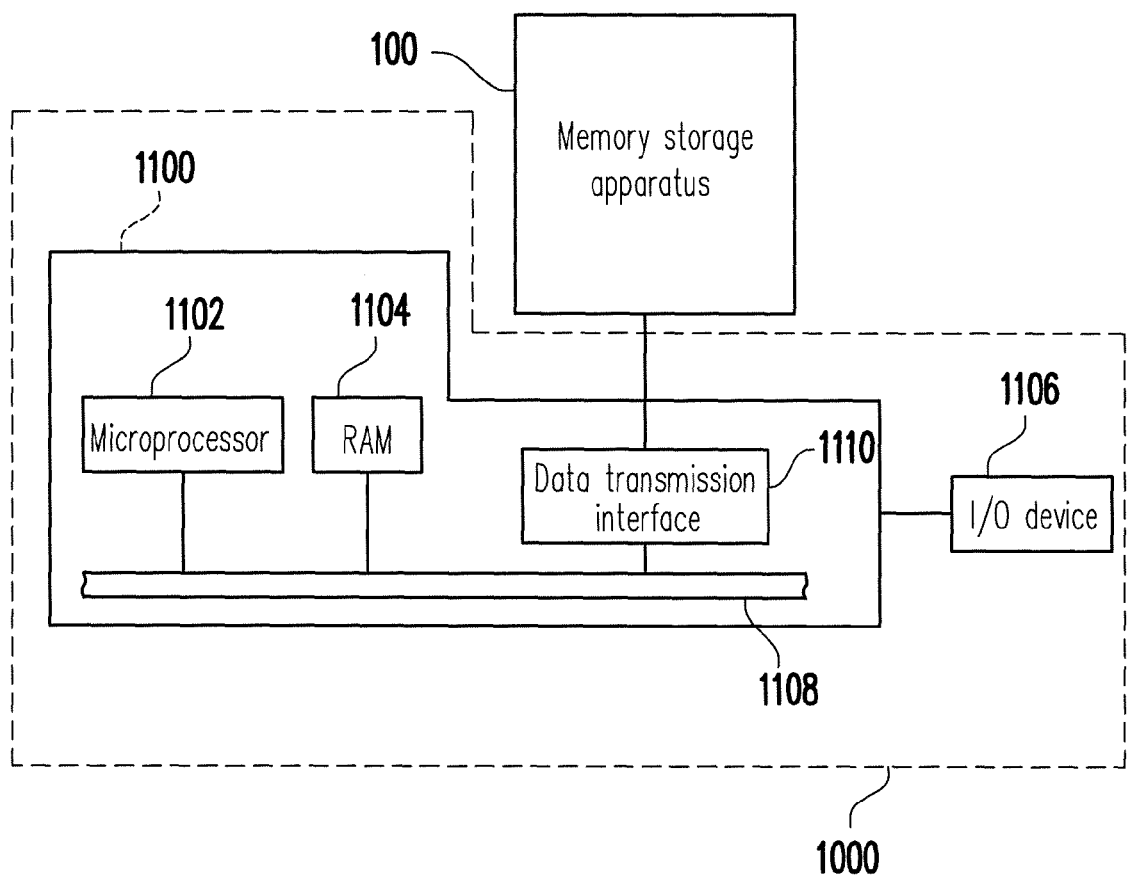
FIG. 1A is a schematic block diagram of a host system using a memory storage apparatus according to the first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In order to improve the use efficiency of capacity of the physical units, the present invention provides a data management method to write two pieces of data corresponding to different logical access addresses into an identical physical page. Several exemplary embodiments are described below to illustrate the present invention in detail.

First Exemplary Embodiment

A memory storage apparatus (i.e., a memory storage system), typically includes a rewritable non-volatile memory module and a controller (i.e., a control circuit). The memory storage apparatus is usually used together with a host system so that the host system can write data into or read data from the memory storage apparatus.

FIG. 1A is a schematic block diagram of a host system using a memory storage apparatus according to the first exemplary embodiment of the present invention.

Figure 1B:
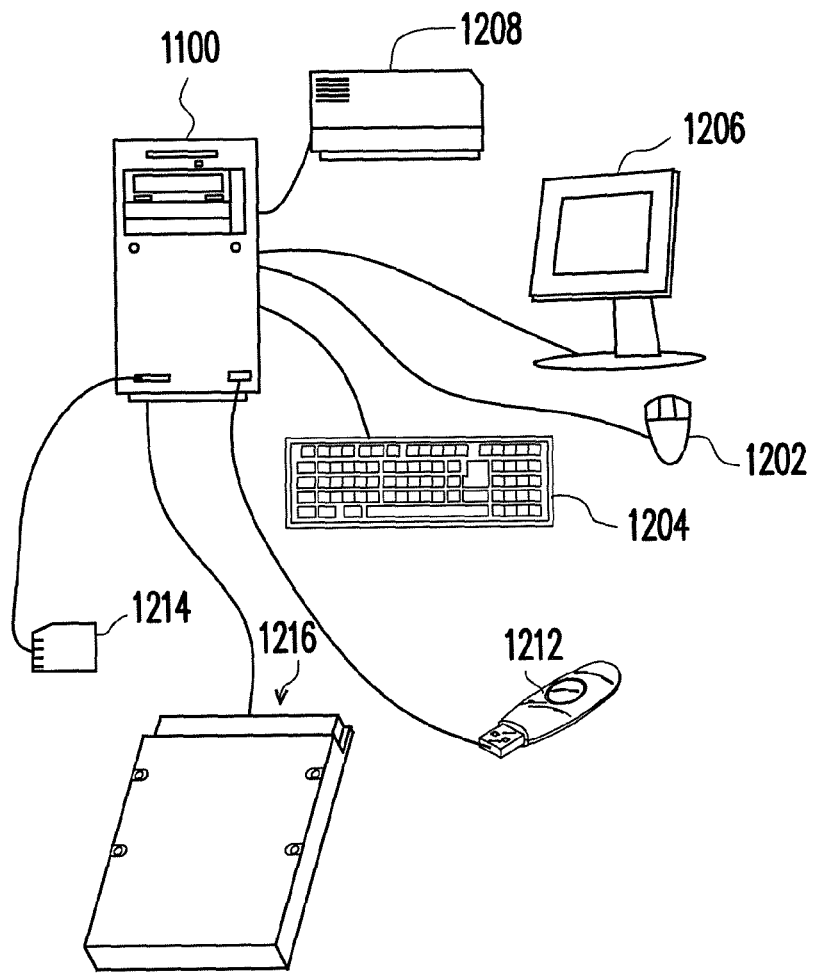
FIG. 1B is a diagram illustrating a computer, an input/output (I/O) device, and a storage apparatus according to the exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206, and a printer 1208 as shown in FIG. 1B. It should be noted that the devices in FIG. 1B do not limit the I/O device 1106; the I/O device 1106 may include other devices.

In the exemplary embodiment of the invention, the memory storage apparatus 100 is coupled to the devices of the host system 1000 through the data transmission interface 1110. By using the microprocessor 1102, the random access memory (RAM) 1104 and the Input/Output (I/O) device 1106, the data can be written into the memory storage apparatus 100 or can be read from the memory storage apparatus 100. For example, the memory storage apparatus 100 may be a rewritable non-volatile memory storage apparatus, such as a flash drive 1212, a memory card 1214, or a solid state drive (SSD) 1216 shown in FIG. 1B.

Figure 1C:
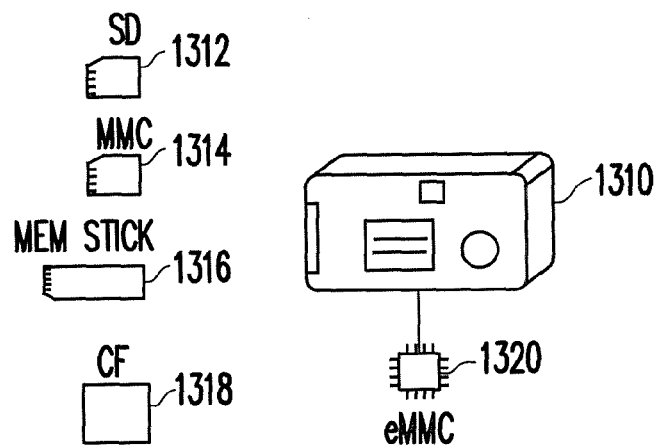
FIG. 1C is a diagram of a host system and a memory storage apparatus according to another exemplary embodiment of the present invention.

Generally, the host system 1000 accompanied with the memory storage apparatus 100 can substantially be any system capable of storing data. Even though the host system 1000 is described as a computer system in the present exemplary embodiment, in another exemplary embodiment of the present invention, the host system 1000 may also be a digital camera, a video camera, a communication device, an audio player, or a video player, and etc. For example, if the host system is a digital camera (video camera) 1310, the rewritable non-volatile memory storage apparatus is then an SD card 1312, an MMC card 1314, a memory stick 1316, a CF card 1318 or an embedded storage device 1320 (as shown in FIG. 1C). The embedded storage device 1320 includes an embedded MMC (eMMC). It should be noted that the eMMC is directly coupled to the substrate of the host system.

Figure 2:
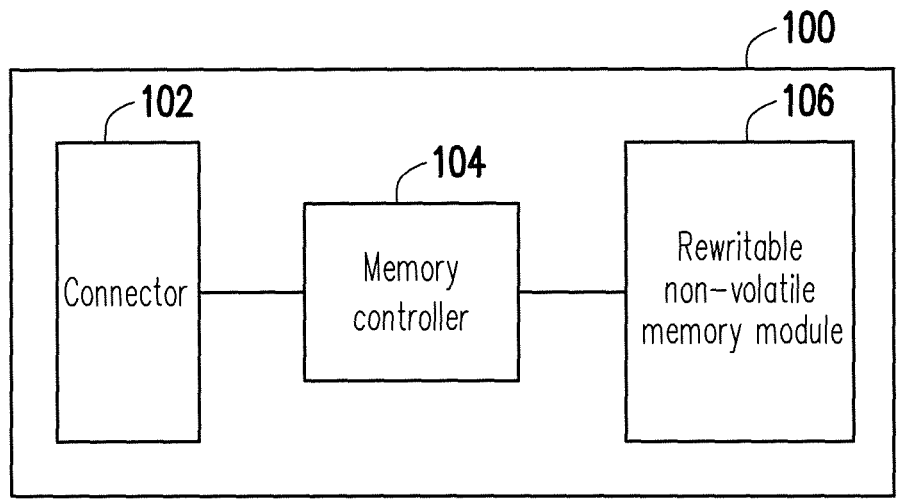
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a rewritable non-volatile memory module 106.

In the exemplary embodiment, the connector 102 complies with a serial advanced technology attachment (SATA) standard. However, it should be noted that the invention is not limited to the aforementioned description and the connector 102 can also conform with an institute of electrical and electronic engineers (IEEE) 1394 standard, a peripheral component interconnect express (PCI Express) standard, a universal serial bus (USB) standard, a secure digital (SD) interface standard, a memory stick (MS) interface standard, a multi-media-card (MMC) interface standard, a compact flash (CF) interface standard, an integrated device electronics (IDE) interface standard or other suitable types of standards.

The memory controller 104 executes a plurality of logical gates or control commands implemented in a hardware form or a firmware form, and performs various data operations such as data writing, reading, and erasing in the rewritable non-volatile memory module 106 according to commands from the host system 1000. In the present exemplary embodiment, the memory controller 104 manages the data stored in the rewritable non-volatile memory module 106 according to the data management method of the present exemplary embodiment. The data management method will be explained in detail with the drawings.

The rewritable non-volatile memory module 106 is coupled to the memory controller 104, and is configured for storing data written by the host system 1000. In the present exemplary embodiment, the rewritable non-volatile memory module 106 is a multi level cell (MLC) NAND flash memory module. However, the present invention is not limited thereto. The rewritable non-volatile memory module 106 may also be a single level cell (SLC) NAND flash memory module, other flash memory modules or other memory modules having the same characteristic.

Figure 3:
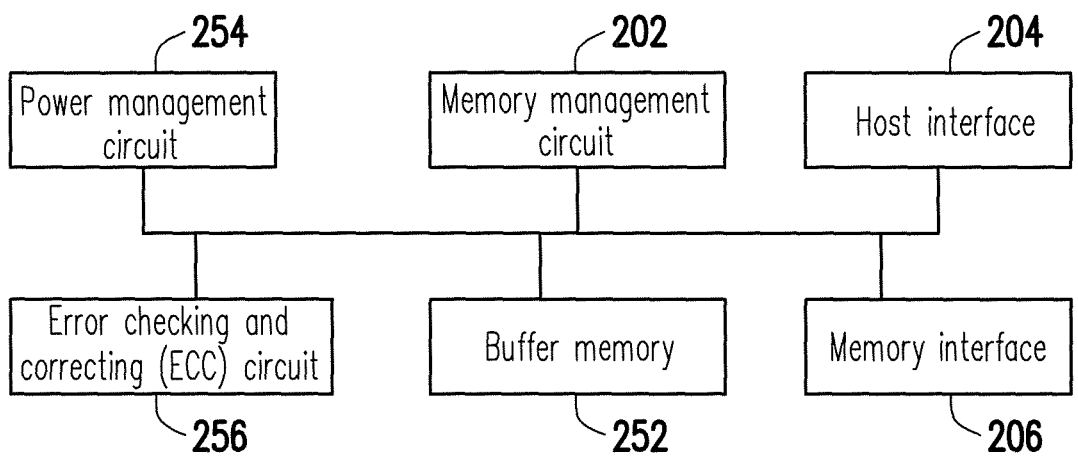
FIG. 3 is a schematic block diagram of a memory controller according to the first exemplary embodiment of the present invention.

FIG. 3 is a schematic block diagram of a memory controller according to the first exemplary embodiment of the present invention.

Referring to FIG. 3, the memory controller 104 includes a memory management circuit 202, a host interface 204 and a memory interface 206.

The memory management circuit 202 is configured for controlling the whole operation of the memory controller 104. To be specific, the memory management circuit 202 has a plurality of control commands, and when the memory storage apparatus 100 is operated, the control commands are executed to manage the data stored in the rewritable non-volatile memory module 106 according to the data management method of the present exemplary embodiment.

In the present exemplary embodiment, the control commands of the memory management circuit 202 are implemented in a firmware form. For example, the memory management circuit 202 has a micro-processor unit (not shown) and a read-only memory (not shown), and these control commands are burned into the read-only memory. When the memory storage apparatus 100 is enabled, the control commands are executed by the micro-processor unit to accomplish the data management method according to the exemplary embodiment of the present invention.

In another embodiment of the present invention, the control commands of the memory management circuit 202 are stored in a specific area (for example, the system area of the memory module exclusively used for storing system data) of the rewritable non-volatile memory module 106 as program codes. Additionally, the memory management circuit 202 may have a micro-processor unit (not shown), a read-only memory (not shown) and a random access memory (not shown). Specifically, the read-only memory has a driver code, and when the memory controller 104 is enabled, the micro-processor unit executes the driver code to load the control commands stored in the rewritable non-volatile memory module 106 into the random access memory of the memory management circuit 202. Then, the micro-processor unit runs these control commands to accomplish the data management method of the present exemplary embodiment. Additionally, in another exemplary embodiment of the present invention, the control commands of the memory management circuit 202 may be implemented in a hardware form.

The host interface 204 is coupled to the memory management circuit 202, and is configured for receiving and identifying commands and data from the host system 1000. Namely, the commands and data from the host system 1000 are transmitted to the memory management circuit 202 through the host interface 204. In the present exemplary embodiment, the host interface 204 complies with an SATA standard. However, it should be understood that the present invention is not limited thereto. The host interface 204 may comply with a PATA standard, an IEEE 1394 standard, a PCI express standard, a USB standard, an SD standard, an MS standard, an MMC standard, a CF standard, an IDE standard, or other suitable data transmission standards.

The memory interface 206 is coupled to the memory management circuit 202 and is used for accessing the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the present invention, the memory controller 104 also includes a buffer memory 252. The buffer memory 252 is coupled to the memory management circuit 202 and configured to temporarily store data and commands from the host system 1000 or data from the rewritable non-volatile memory module 106.

In an exemplary embodiment of the present invention, the memory controller 104 also includes a power management circuit 254. The power management circuit 254 is coupled to the memory management circuit 202 and is configured for controlling the power of the memory storage apparatus 100.

In an embodiment of the invention, the memory controller 104 also includes an error checking and correcting circuit 256. The error checking and correcting circuit 256 is coupled to the memory management circuit 202, and is configured for executing an error checking and correcting procedure to ensure data accuracy. To be specific, when the memory management circuit 202 receives a write command from the host system 1000, the error checking and correcting circuit 256 generates an error checking and correcting (ECC) code for data corresponding to the write command, and the memory management circuit 202 writes the data and the corresponding ECC code into the rewritable non-volatile memory module 106. Subsequently, when the memory management circuit 202 reads the data from the rewritable non-volatile memory module 106, the memory management circuit 202 simultaneously reads the corresponding ECC code, and the error checking and correcting circuit 256 executes an ECC procedure for the read data based on the ECC code.

Figure 4A:
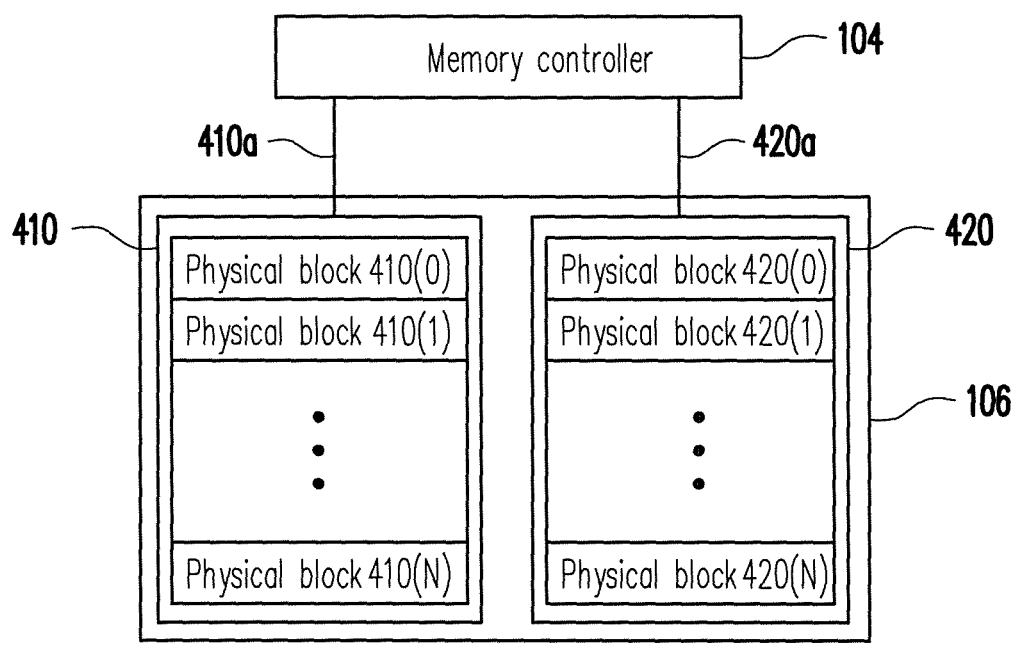
FIG. 4A is a schematic block diagram of a rewritable non-volatile memory module according to the first exemplary embodiment of the present invention.

FIG. 4A is a schematic block diagram of a rewritable non-volatile memory module according to the first exemplary embodiment of the present invention.

Referring to FIG. 4A, the rewritable non-volatile memory module 106 includes a first memory sub-module 410 and a second memory sub-module 420. For example, the first memory sub-module 410 and the second memory sub-module 420 are respectively memory die. The first memory sub-module 410 has the physical blocks 410(0) to 410(N), and the second memory sub-module 420 has the physical blocks 420(0) to 420(N). For example, the first memory sub-module 410 and the second memory sub-module 420 are respectively coupled to the memory controller 104 via a data bus 410a and a data bus 420a individually. However, it should be noted that in another exemplary embodiment of the present invention, the first memory sub-module 410 and the second memory sub-module 420 can also be coupled to the memory controller 104 via just one data bus. Each physical block of the first memory sub-module 410 and the second memory sub-module 420 respectively have a plurality of physical pages, and each physical page has at least one physical sector, wherein the physical pages belonging to the same physical block can be written individually and are erased simultaneously. For example, each physical block is composed of 128 physical pages, and each physical page has 16 physical sectors. Namely, using each physical sector as 512 bytes, for example, each physical page has a capacity of 8 kilobytes. However, it should be noticed that the invention is not limited thereto. Each physical block may have 64 physical pages, 256 physical pages, or any other amount of physical pages.

In detail, each physical block is the smallest erasing unit. Namely, each physical block contains the least number of memory cells that are erased together. And, one physical page is the smallest programming unit. Namely, each physical page is the smallest unit for writing data. However, it should be noted that in another exemplary embodiment of the present invention, the smallest unit for writing data can also be a physical sector or another size.

It should be noted that the description of the present exemplary embodiment is based on the example that the rewritable non-volatile memory module 106 includes 2 memory sub-modules, but the present invention is not limited thereto. In another exemplary embodiment of the present invention, the rewritable non-volatile memory module 106 includes 4 or 8 memory sub-modules.

Figure 4D:
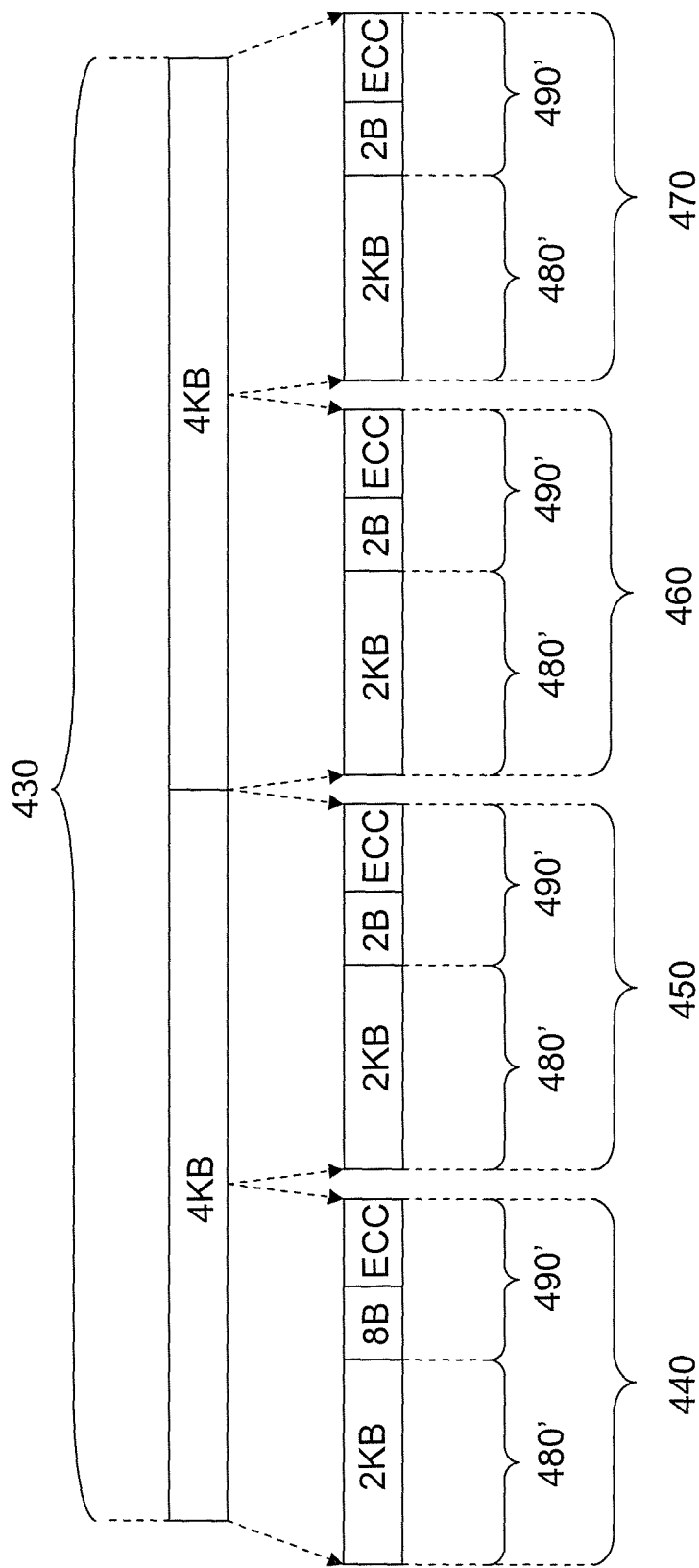
FIG. 4D is a diagram illustrating an example of a physical page of a physical block according to another embodiment of the present invention.

FIG. 4B is a diagram illustrating an example of a physical page of a physical block according to the first exemplary embodiment of the present invention. FIG. 4C and FIG. 4D are diagrams illustrating two examples of the physical page of the physical block according to different exemplary embodiments of the present invention.

Referring to FIG. 4B, each of the physical blocks 410(0)-420(N) and 420(0)-420(N) has a plurality of physical pages 430. In the present exemplary embodiment, the capacity of each physical page 430 is 8 kilobytes, and each physical page 430 includes a data bit area 480 and a redundant bit area 490. The data bit area 480 is used for storing user data, and the redundant bit area 490 is used for storing system data of a corresponding physical page 430. The system data, for example, includes error checking and correcting (ECC) code, the logical access address corresponding to the user data, an offset, and a mask.

It should be noted that, in other exemplary embodiments of the present invention, the way for allocating the stored data of the physical pages 430 is not limited to the way as shown in FIG. 4B and could be other allocation ways. For example, as shown in FIG. 4C, in an exemplary embodiment of the present invention, each of the physical pages 430 is further divided into a first record area 432 and a second record area 434. Each of the first record area 432 and the second record area 434 is capable of storing data of 4 kilobytes. The data stored in first record area 432 and the second record area 434 of the same physical page 430 could be corresponding to either the same one logical page or two different logical pages. In other words, data corresponding to two different logical pages could be written into the same one physical page 430.

Moreover, it should be noted that each of the physical pages 430 could be divided into more record areas in other exemplary embodiments of the present invention. For example, each of the physical pages 430 is divided into three, four, or more record areas for storing data corresponding to two or more different logical pages. Wherein, the data corresponding to two or more different logical pages could be written into the same one of the physical pages 430.

In an exemplary embodiment of the present invention, the physical page 430 is divided into a plurality of record areas, and each of which includes a data bit area and a redundant bit area. Referring to FIG. 4D, the physical page 430 is divided into a first record area 440, a second record area 450, a third record area 460 and a fourth record area 470. Each of the first record area 440, the second record area 450, the third record area 460 and the fourth record area 470 has a data bit area 480' and a redundant bit area 490'. Each of the data bit areas 480' is used for storing user data of 2 kilobytes, and the four redundant bit areas 490' are used for storing system data corresponding to physical page 430. The system data, for example, could be the ECC code, the logical access address, the offset, and the mask.

Figure 5A:
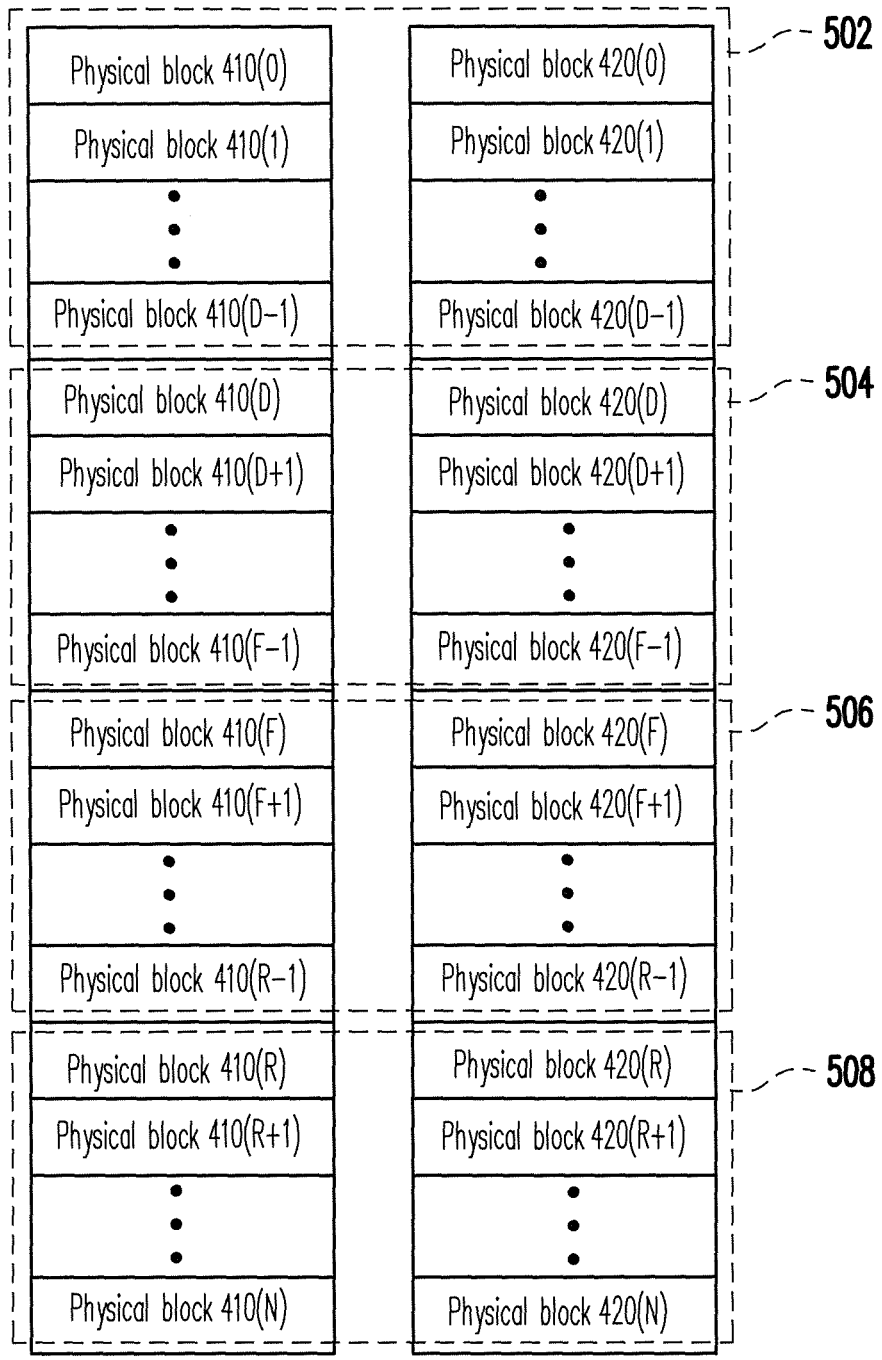
FIGS. 5A and 5B are exemplary diagrams of managing a physical block according to the first exemplary embodiment of the present invention.
Figure 5B:
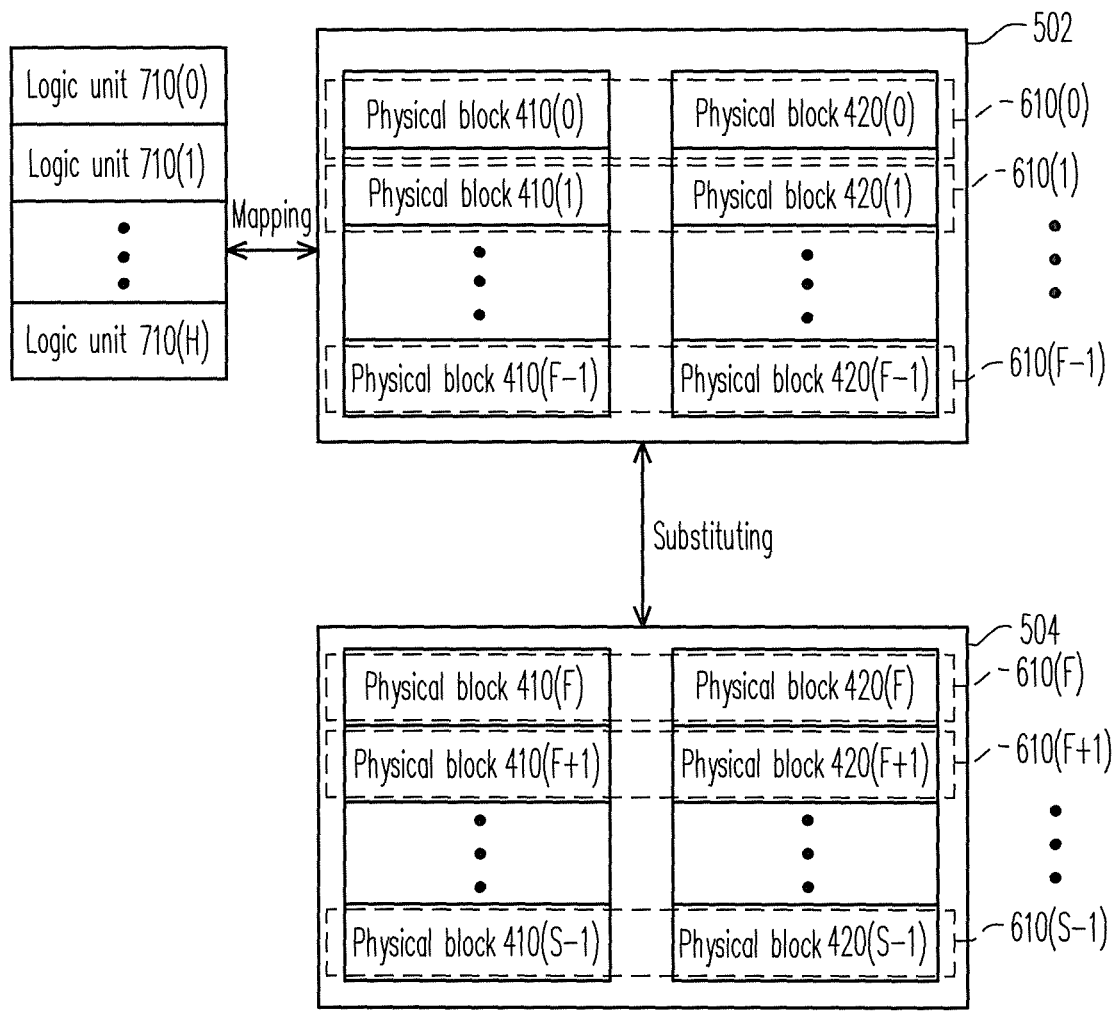

FIGS. 5A and 5B are exemplary diagrams of managing a physical block according to the first exemplary embodiment of the present invention.

Referring to FIG. 5A, the memory management circuit 202 of the memory controller 104 logically groups the physical blocks 410(0)-410(N) and the physical blocks 420(0)-420(N) into a data area 502, a free area 504, a system area 506 and a replacement area 508.

The physical blocks of the data area 502 and the free area 504 are used for storing data written by the host system 1000. To be specific, the physical blocks of the data area 502 are regarded as physical blocks with data, and the physical blocks of the free area 504 are physical blocks used for substituting the physical blocks of the data area 502. Namely, when the host system 1000 receives write commands and data corresponding to the write commands, the memory management circuit 202 gets a physical block from the free area 504, and writes data into the gotten physical block, to substitute the physical block of the data area 502.

The physical blocks logically belonging to the system area 506 are for recording system data. For example, the system data includes information such as the manufacturer and model relating to the rewritable non-volatile memory module, the number of physical blocks in the rewritable non-volatile memory module, and the number of physical pages in each physical block.

The physical blocks logically belonging to the replacement area 508 are used for replacing damaged physical blocks. In detail, if there are still normal physical blocks in the replacement area 508 and a physical block in the data area 502 is damaged, the memory management circuit 202 gets a normal physical block from the replacement area 508 for replacing the damaged physical block. It should be noted that in the present exemplary embodiment, the memory management circuit 202 replaces the damaged physical blocks in the first memory sub-module 410 with the normal physical blocks in the replacement area 508 belonging to the first memory sub-module 410, and replaces the damaged physical blocks in the second memory sub-module 420 with the normal physical blocks in the replacement area 508 belonging to the second memory sub-module 420. Thus, when the memory management circuit 202 is executing writing commands, it simultaneously uses the data bus 410a and the data bus 420a to write data in a parallel manner.

Referring to FIG. 5B, the memory management circuit 202 groups the physical blocks 410(0)-410(S-1) and the physical blocks 420(0)-420(S-1) of the data area 502 and the free area 504 into a plurality of physical units, and manages the physical blocks with the physical units as units. For example, the physical blocks 410(0)-410(S-1) and the physical blocks 420(0)-420(S-1) are paired and grouped into the physical units 610(0)-610(S-1). In the present exemplary embodiment, each physical unit respectively belongs to different memory sub-modules composed of 2 physical blocks. Nevertheless, it should be understood that the present invention is not limited thereto. In another exemplary embodiment, each physical unit is composed of one physical block. That is, the memory management circuit 202 manages with each physical block as a unit. In another exemplary embodiment, each physical unit can also be composed of at least one physical block of the same memory sub-module or different memory sub-modules.

In addition, the memory management circuit 202 will configure logical units 710(0)-710(H) for mapping the physical units of the data area 502, wherein each logical unit includes a plurality of logical pages sequentially mapping the physical pages corresponding to the physical units, and each logical page has a plurality of logical sectors for mapping the physical sectors corresponding to the physical pages. In the present exemplary embodiment, the memory management circuit 202 maintains a logical unit-physical unit mapping table for recording the mapping relationship between the logical units 710(0)-710(H) and the physical units of the data area 504. For example, when the host system 1000 wants to access one of the logical access addresses, the memory management circuit 202 can convert the logical access address that the host system 1000 accessed into the corresponding logical unit, the corresponding logical pages, or the corresponding logical sector, and access data from corresponding physical pages of the physical units through the logical unit-physical unit mapping table.

In the present exemplary embodiment, the memory management circuit 202 will get a physical unit from the free area 504 to be a global random physical unit, and the data (also referred to as update data) corresponding to the write commands from the host system 1000 are written into the global random physical unit. In the present exemplary embodiment, the memory management circuit 202 is capable of writing data corresponding to different logical pages into the same one of the physical pages of the global random physical unit. It should be noted that though the gotten physical unit is referred to as a global random physical unit, the present invention is not limited thereto. In detail, the memory management circuit 202 may also get a physical unit from the data area 502, the system area 506 or the replacement area 508 and write the received update data into an identical physical page of the gotten physical unit.

Specifically, when the memory storage apparatus 100 receives write commands from the host system 1000, data corresponding to the write commands can be sequentially written into the global random physical unit. Also, when the global random physical unit is full, the memory management circuit 202 will again get a physical unit from the free area 504 to be another global random physical unit, in order to continue to write update data corresponding to the writing commands from the host system 1000. Once the global random physical units reaches an upper limit, the memory management circuit 202 will perform a data merging process, so the data stored in the global random physical unit will become invalid data, and associates the global random physical unit with the free area 504.

FIGS. 6A-6K are diagrams illustrating examples of writing data according to the first exemplary embodiment of the present invention.

For ease of description, here it is assumed the data area 502 has 5 physical units, the free area 504 has 4 physical units, and each physical unit has 4 physical pages. Data desired to be written in each physical unit must be written in according to the order of the physical pages, and the upper limit of the global random physical units is 3.

Figure 6A:
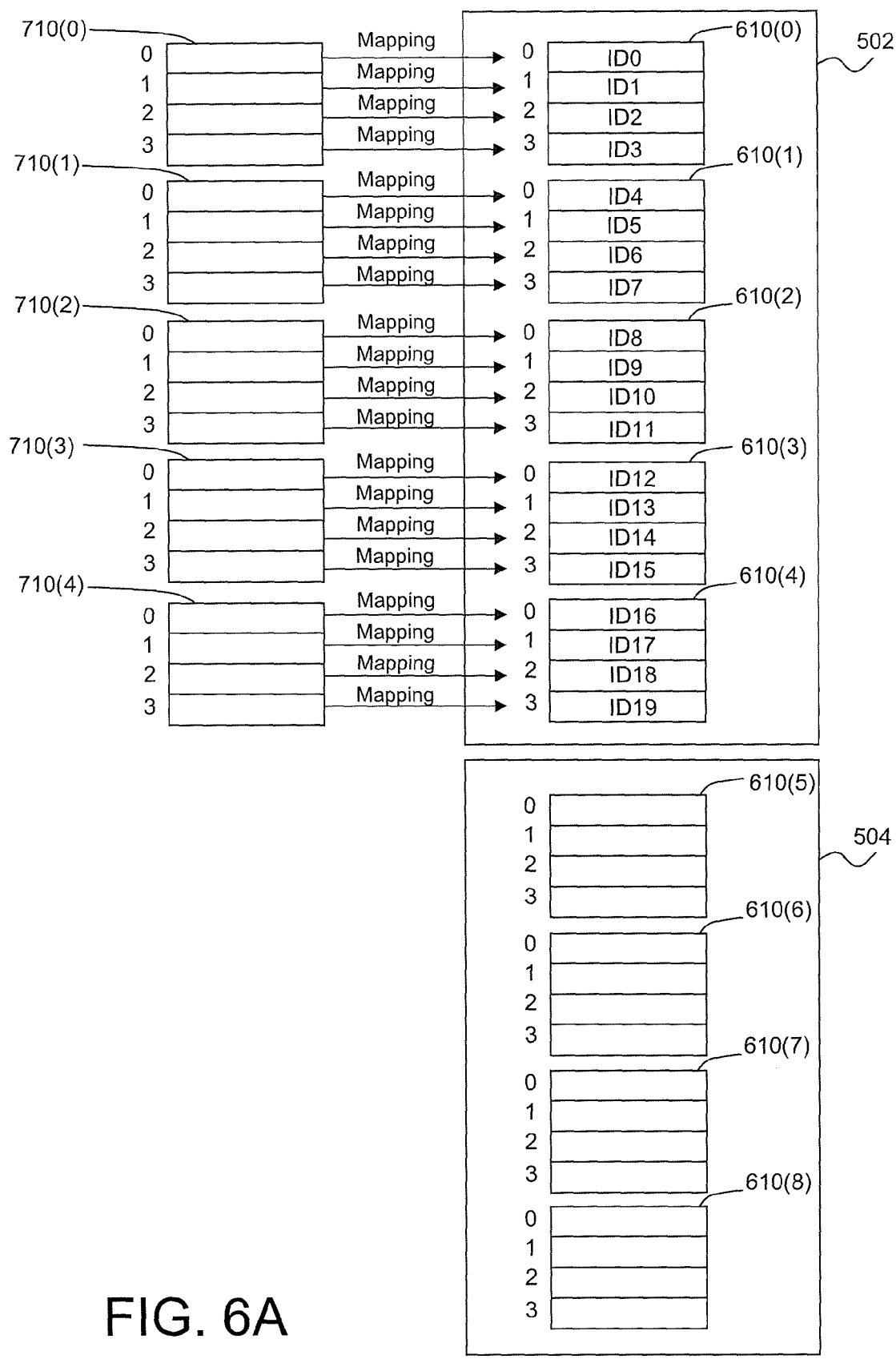
FIGS. 6A to 6I are diagrams illustrating examples of writing data according to the first embodiment of the present invention.

Referring to FIG. 6A, in the initial mode of the memory storage apparatus 100, the logical pages of the logical units 710(0)-710(4) can sequentially map the physical pages of the physical units 610(0)-610(4) of the data area 502, and the free area 504 has the physical units 610(5)-610(8). Namely, the memory management circuit 202 will record a mapping relationship between the logical units 710(0)-710(4) and the physical units 610(0)-610(4) in the logical unit-physical unit mapping table, and the physical pages of the physical units 610(0)-610(4) are regarded as data (i.e. initial data ID0~ID19) stored in the logical pages belonging to the logical units 710(0)-710(4). It should be noted that when the memory storage apparatus 100 has just been manufactured, the initial data ID1-ID19 can be empty data. In addition, the memory management circuit 202 will record usable physical units 610(5)-610(8) in the free area 504.

Figure 6B:
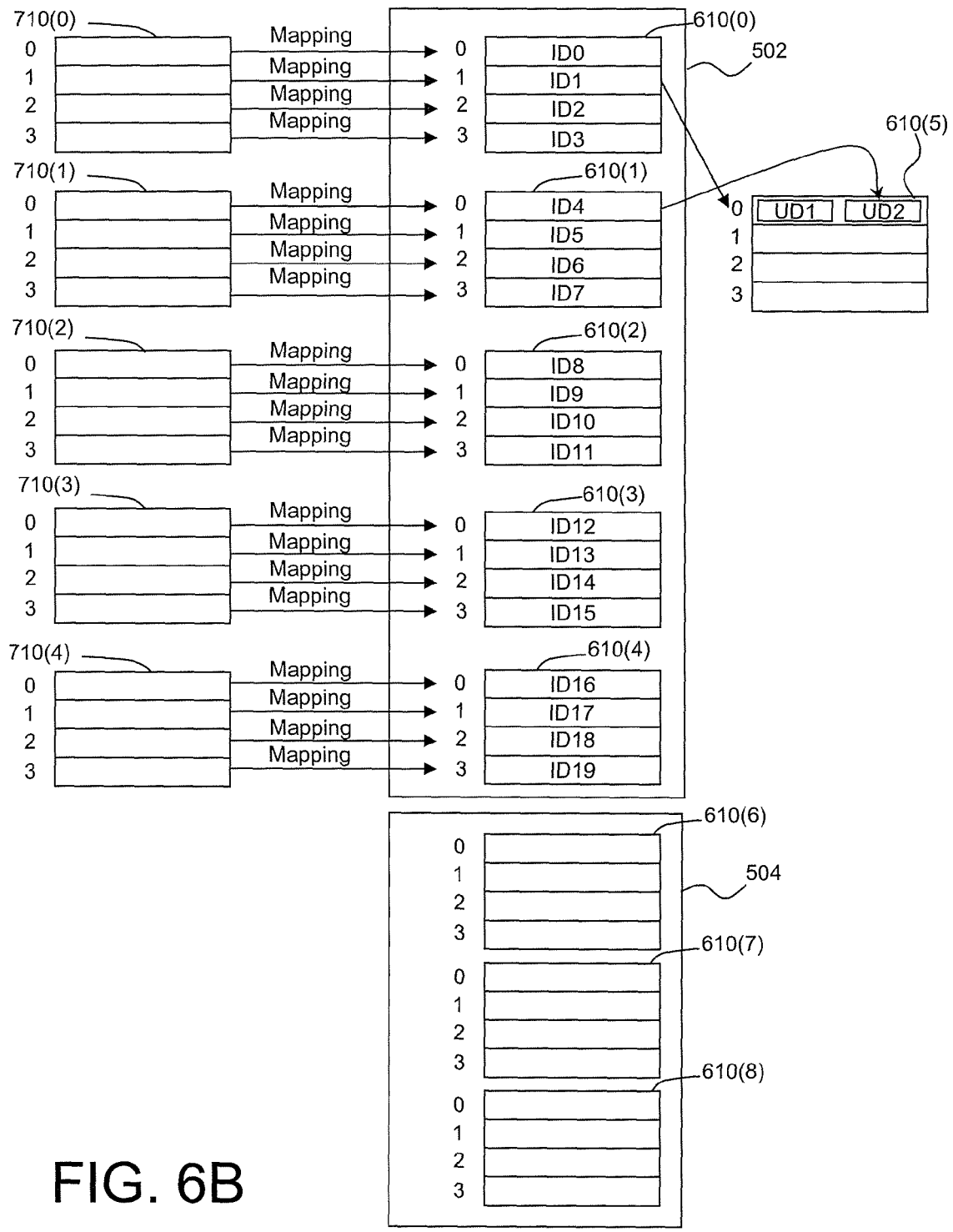

Referring to FIG. 6B, the memory management circuit 202 updates portions of the data of the 1 logical page of the logical unit 710(0) and the 0 logical page of the logical unit 710(1). The update data of the 1 logical page of the logical unit 710(0) is UD1, and the update data of the 0 logical page of the logical unit 710(1) is UD2. The two pieces of update data UD1 and UD2 are corresponding to different logical pages and accordingly corresponding to different logical access addresses. Each of the pieces of update data UD1 and UD2 has a size that is not greater than 4 kilobytes. Therefore, the total data capacity of the two pieces of update data UD1 and UD2 is not greater than the capacity of a single physical page (i.e. 8 kilobytes) such that the two pieces of update data UD1 and UD2 could be written into an identical physical page. Before the two pieces of update data UD1 and UD2 are written into the rewritable non-volatile memory module 106, the memory management circuit 202 stores the two pieces of update data UD1 and UD2 in the buffer memory 252 temporarily. Then, the memory management circuit 202 will get the physical unit 610(5) from the free area 504 to be a global random physical unit and issue a programming command to write the two pieces of update data UD1 and UD2 stored in the buffer memory 252 into the 0 physical page of the physical unit 610(5) simultaneously.

Figure 6C:
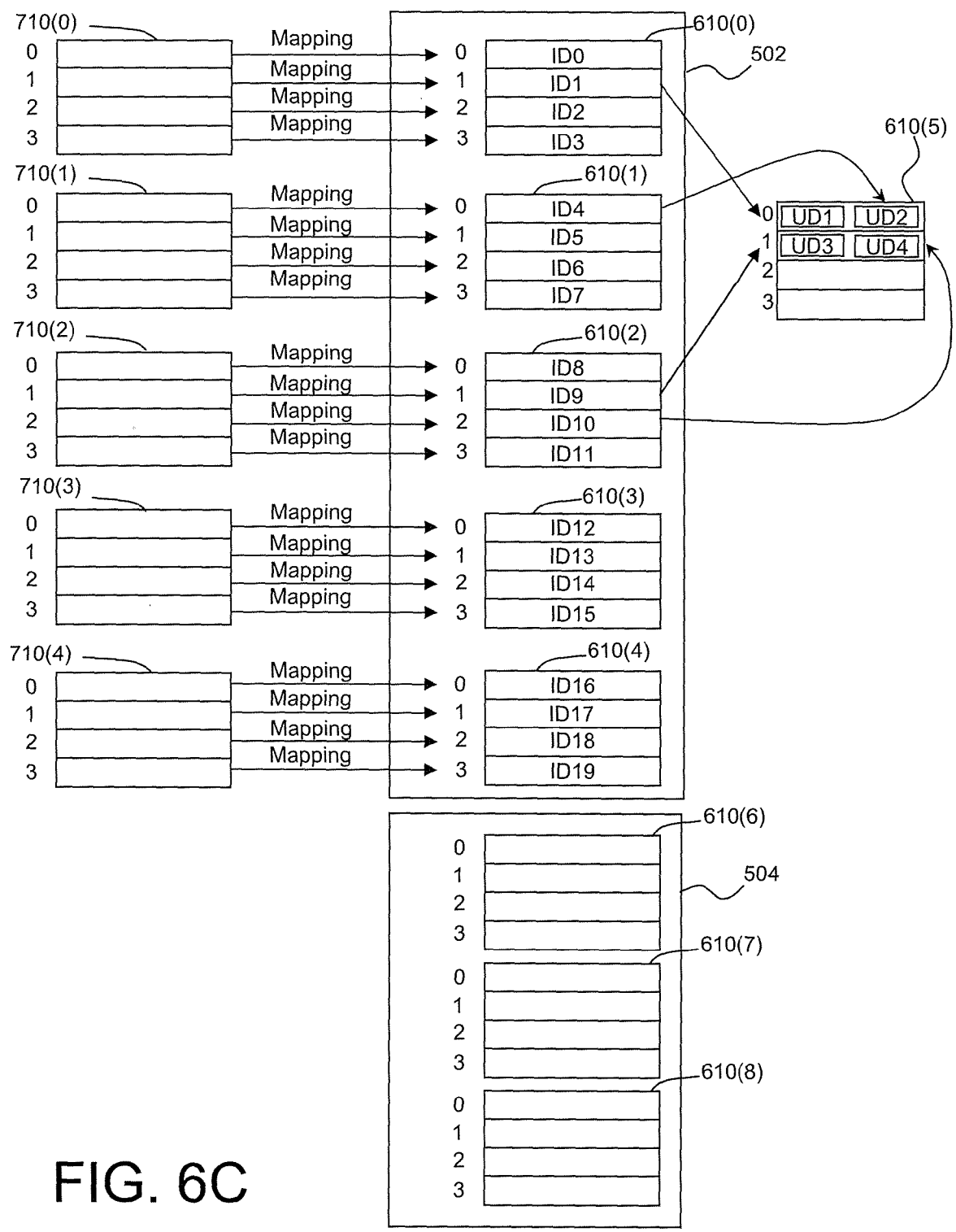

Referring to FIG. 6C, following FIG. 6B, the memory management circuit 202 further updates portions of the data of the 1 and 2 logical pages of the logical unit 710(2). The update data of the 1 logical page of the logical unit 710(2) is t UD3, and the update data of the 2 logical page of the logical unit 710(2) is UD4. The two pieces of update data UD3 and UD4 are corresponding to different logical pages and accordingly corresponding to different logical access addresses. Besides, each of the pieces of update data UD3 and UD4 also has a size that is not greater than 4 kilobytes. Therefore, the memory management circuit 202 temporarily stores the two pieces of update data UD3 and UD4 in the buffer memory 252, and then writes the two pieces of update data UD3 and UD4 stored in the buffer memory 252 into the 1 physical page of the physical unit 610(5) simultaneously.

Figure 6D:
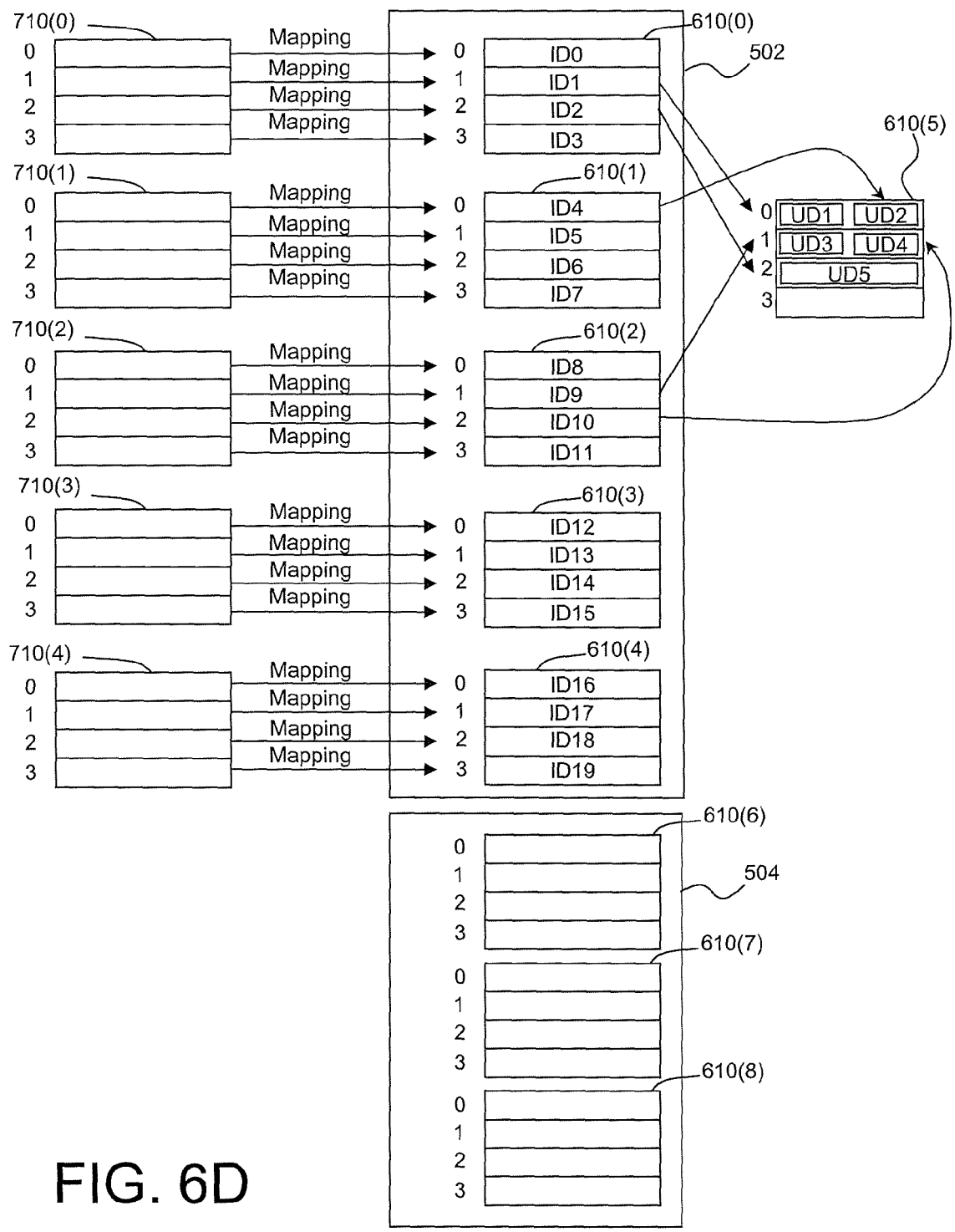

Referring to FIG. 6D, following FIG. 6C, the memory management circuit 202 further updates the 2 logical page of the logical unit 710(0). The update data of the 2 logical page of the logical unit 710(0) is UD5. The data capacity of the update data UD5 is greater than 4 kilobytes and not greater than 8 kilobytes. Therefore, the memory management circuit 202 writes the update data UD5 into the 2 physical page of the physical unit 610(5) independently.

Figure 6E:
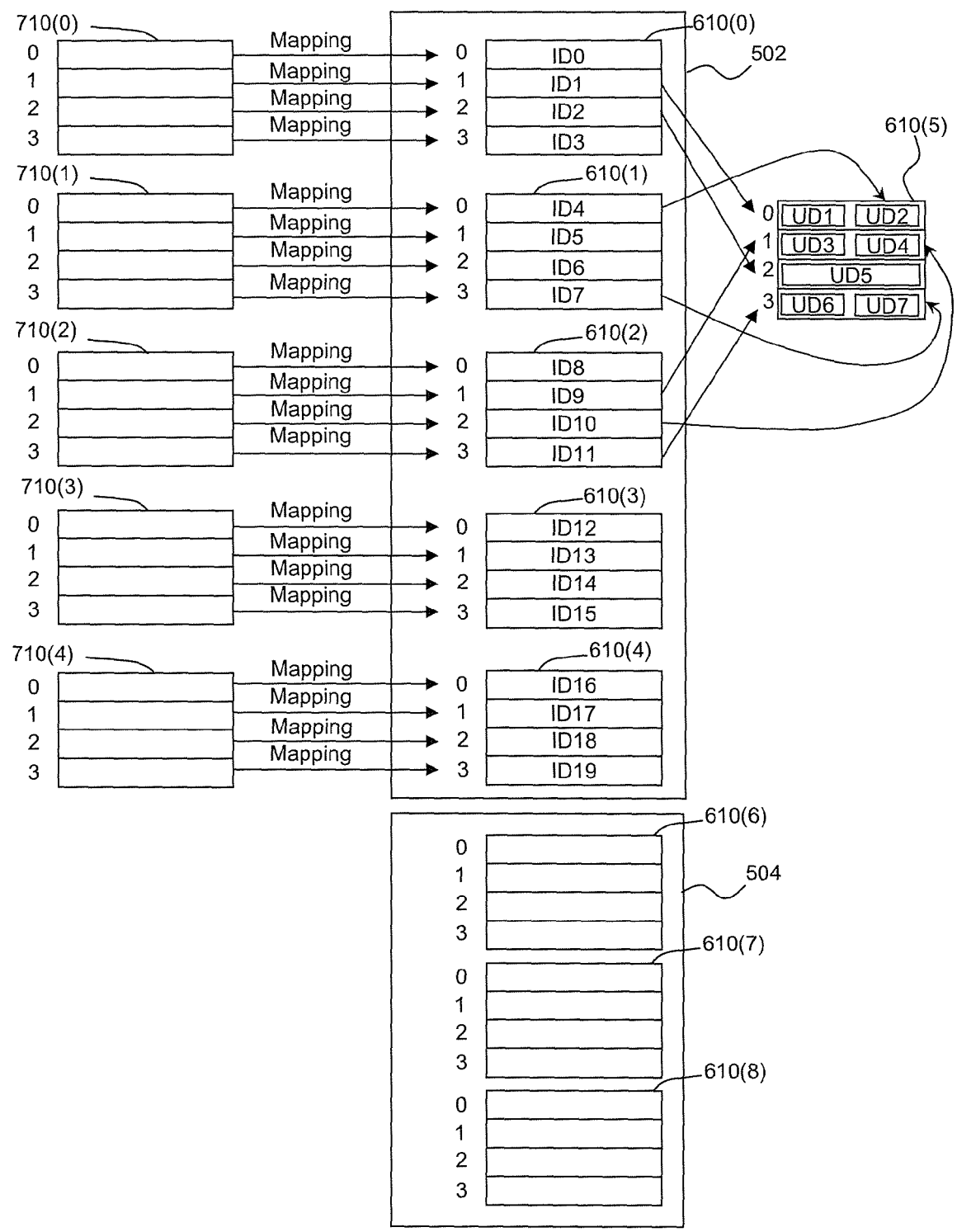

Referring to FIG. 6E, following FIG. 6D, the memory management circuit 202 further updates portions of the data of the 3 logical page of the logical unit 710(2) and the 3 logical page of the logical unit 710(1). The update data of the 3 logical page of the logical unit 710(2) is UD6, and the update data of the 3 logical page of the logical unit 710(1) is UD7. The two pieces of update data UD6 and UD7 are corresponding to different logical pages and accordingly corresponding to different logical access addresses. Besides, each of the pieces of update data UD6 and UD7 also has a size that is not greater than 4 kilobytes. Therefore, the memory management circuit 202 temporarily stores the two pieces of update data UD6 and UD7 in the buffer memory 252, and then writes the two pieces of update data UD6 and UD7 stored in the buffer memory 252 into the 3 physical page of the physical unit 610(5) simultaneously.

Figure 6F:
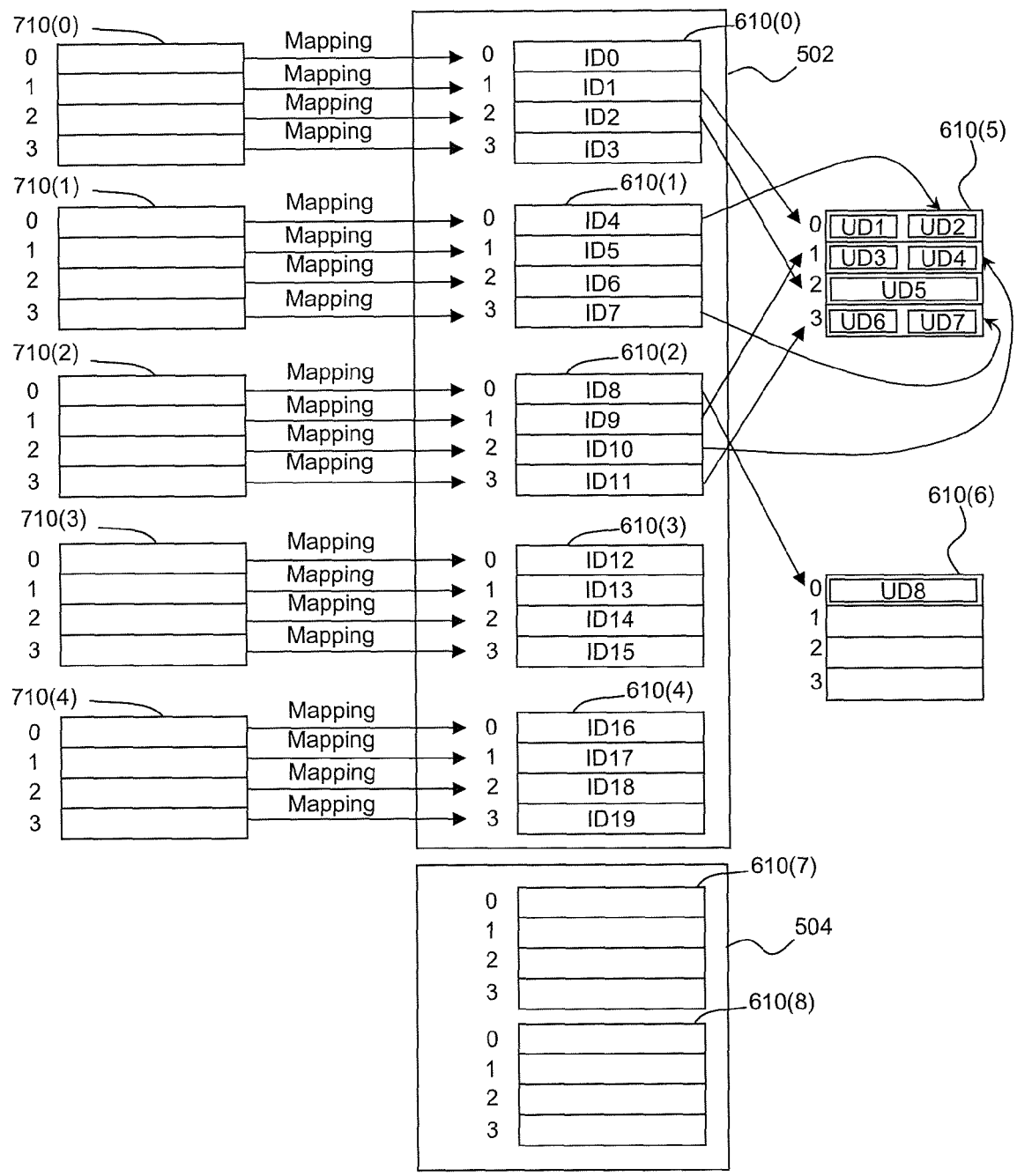

Referring to FIG. 6F, following FIG. 6D, the memory management circuit 202 further updates the 0 logical page of the logical unit 710(2). The update data of the 0 logical page of the logical unit 710(2) is UD8, and the size of the update data UD8 is greater than 4 kilobytes and not greater than 8 kilobytes. Since the first global random physical unit 610(5) is full, the memory management circuit 202 gets the physical unit 610(6) from the free area 504 to be a second global random physical unit and issues a programming command to independently write the update data UD8 into the 0 physical page of the physical unit 610(6).

Figure 6G:
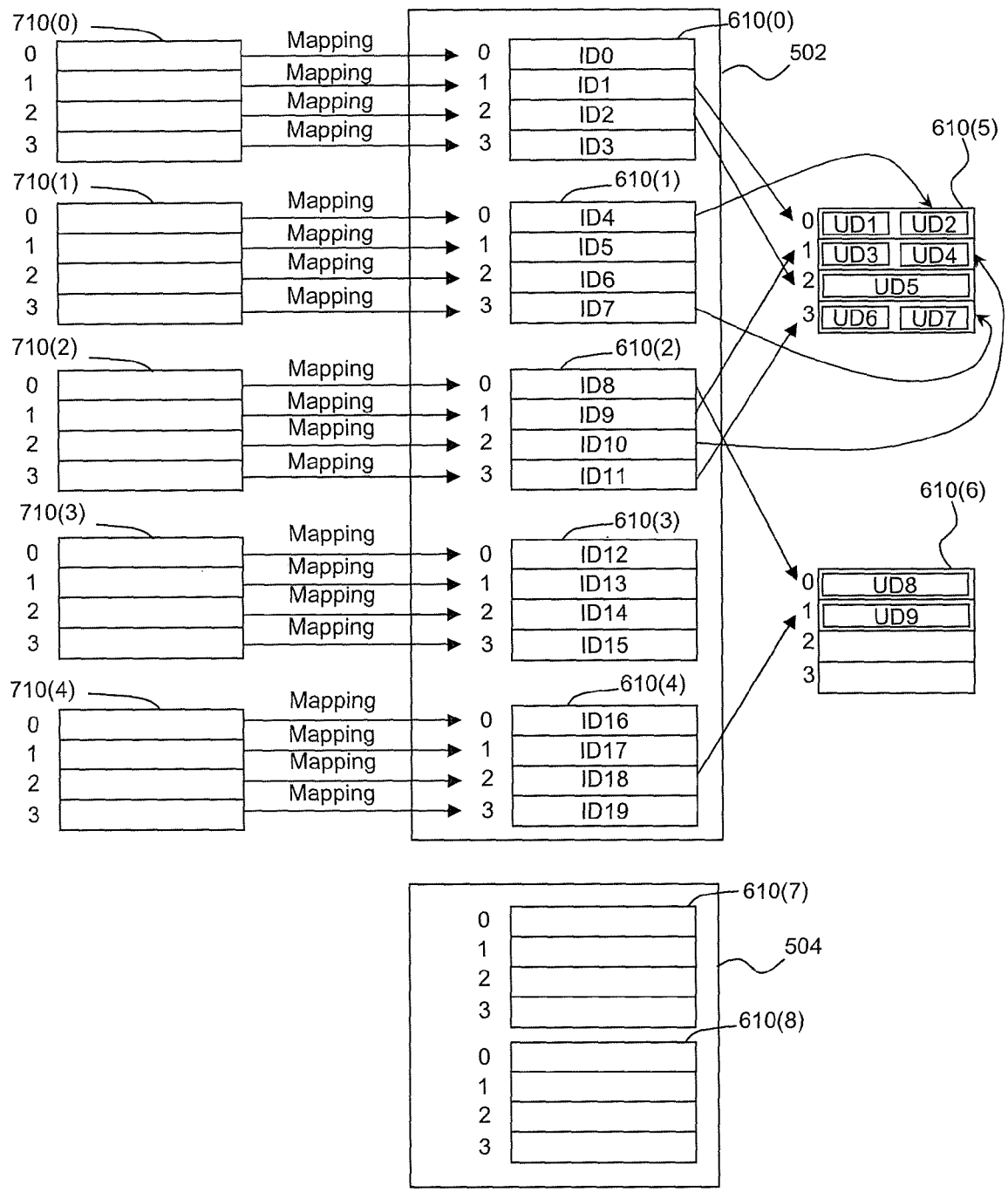

Referring to FIG. 6G, following FIG. 6F, the memory management circuit 202 further updates the 2 logical page of the logical unit 710(4). The update data of the 2 logical page of the logical unit 710(4) is UD9. The size of the update data UD9 is greater than 4 kilobytes and not greater than 8 kilobytes. Therefore, the memory management circuit 202 writes the update data UD9 into the 1 physical page of the physical unit 610(6) independently.

Figure 6H:
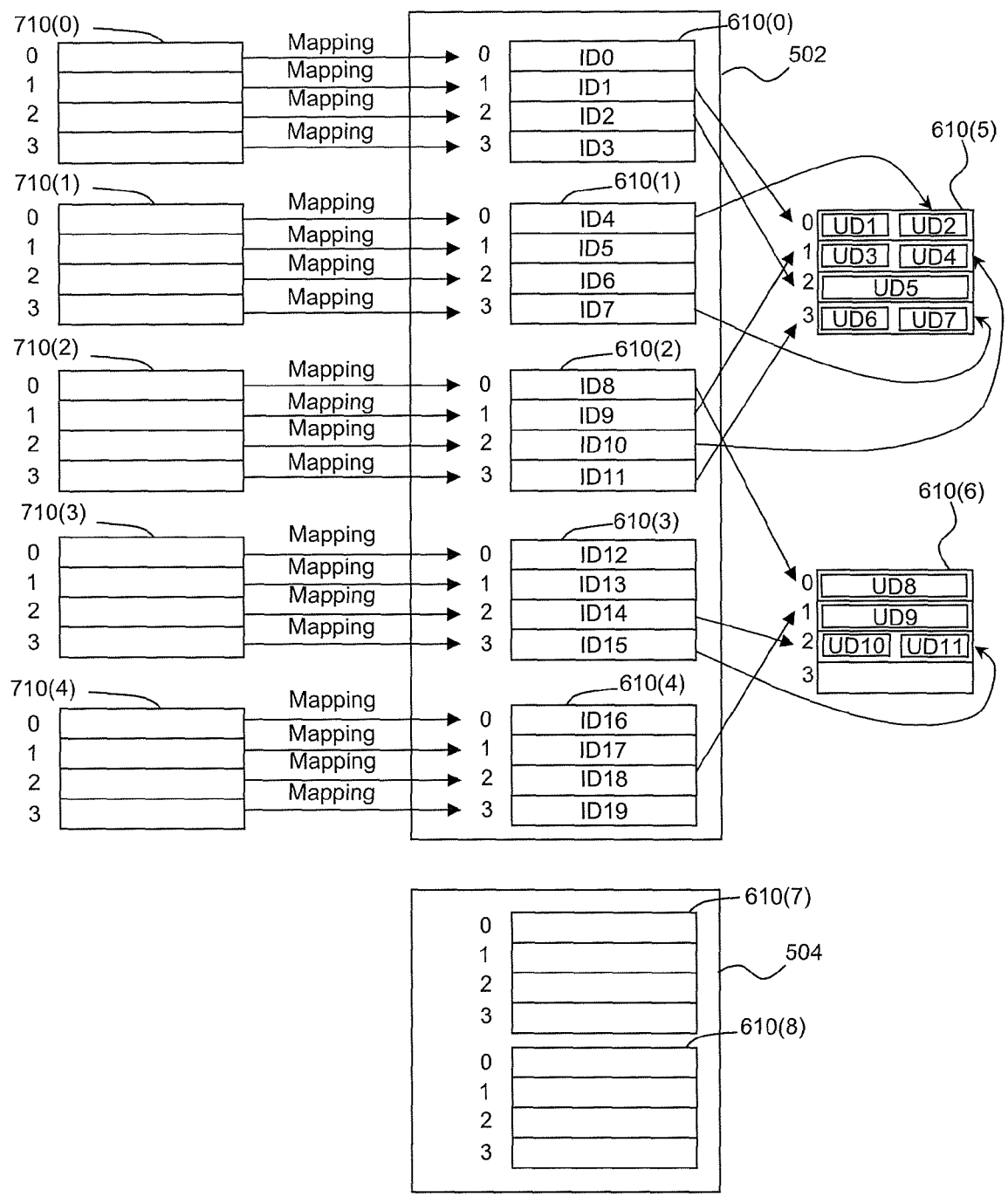

Referring to FIG. 6H, following FIG. 6G, the memory management circuit 202 further updates portions of the data of the 2 and 3 logical pages of the logical unit 710(3). The update data of the 2 logical page of the logical unit 710(3) is UD10, and the update data of the 3 logical page of the logical unit 710(3) is UD11. The two pieces of update data UD10 and UD11 are corresponding to different logical pages and accordingly corresponding to different logical access addresses. Besides, each of the pieces of update data UD10 and UD11 also has a size that is not greater than 4 kilobytes. Therefore, the memory management circuit 202 temporarily stores the two pieces of update data UD10 and UD11 in the buffer memory 252, and then writes the two pieces of update data UD10 and UD11 stored in the buffer memory 252 into the 2 physical page of the physical unit 610(6) simultaneously.

Figure 6I:
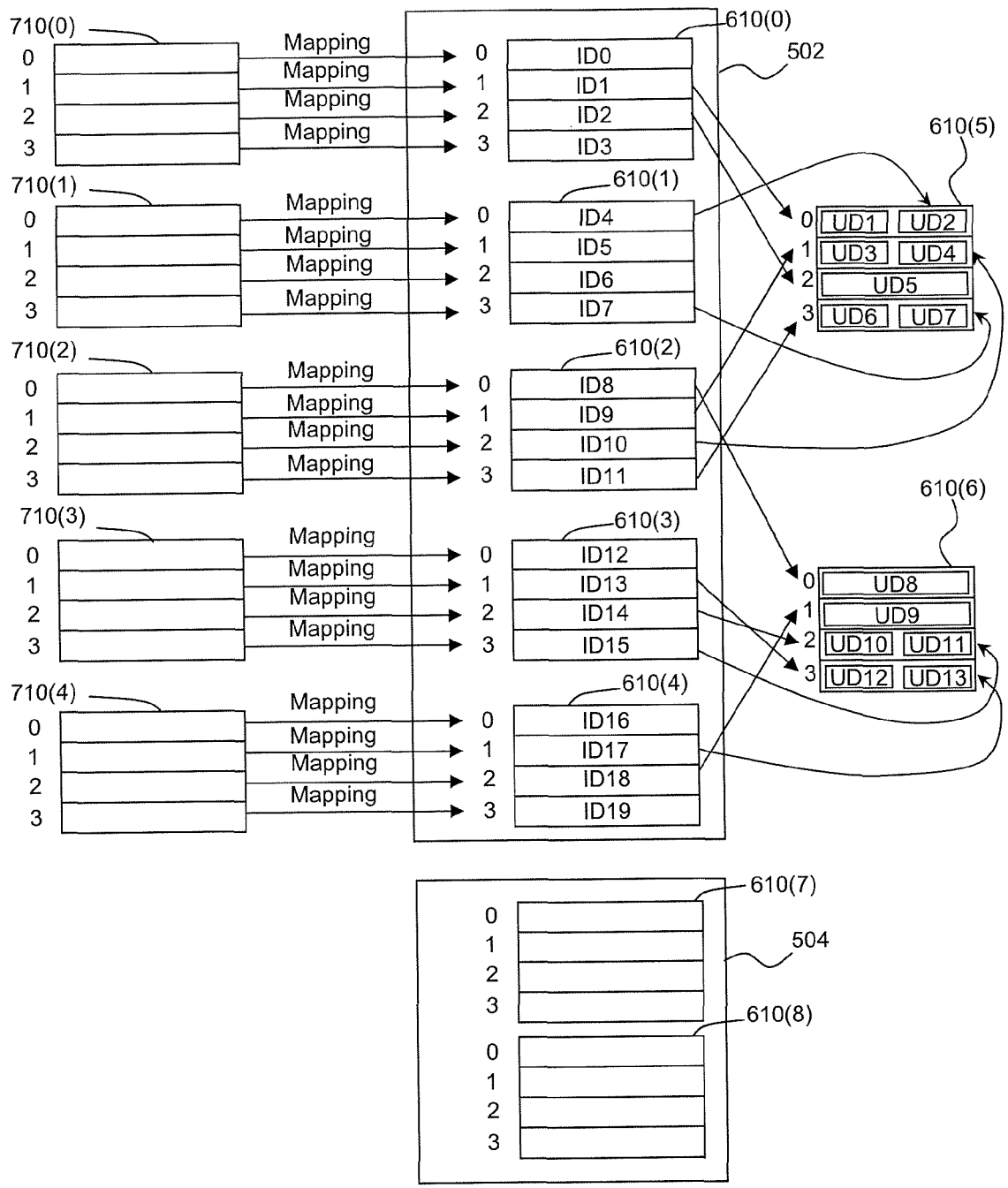

Referring to FIG. 6I, following FIG. 6H, the memory management circuit 202 further updates portions of the data of the 1 logical page of the logical unit 710(3) and the 1 logical page of the logical unit 710(4). The update data of the 1 logical page of the logical unit 710(3) is UD12, and the update data of the 1 logical page of the logical unit 710(4) is UD13. The two pieces of update data UD12 and UD13 are corresponding to different logical pages and accordingly corresponding to different logical access addresses. Besides, each of the pieces of update data UD12 and UD13 also has a size that is not greater than 4 kilobytes. Therefore, the memory management circuit 202 temporarily stores the two pieces of update data UD12 and UD13 in the buffer memory 252, and then writes the two pieces of update data UD12 and UD13 stored in the buffer memory 252 into the 3 physical page of the physical unit 610(6) simultaneously.

Similarly, the memory management circuit 202 will sequentially write the data from the host system 1000 into the global random physical unit. In particular, when the amount of the global random physical units gets to 3, the memory management circuit 202 will perform a data merging process during write commands, to avoid exhausting the physical units of the free area 504.

Figure 6J:
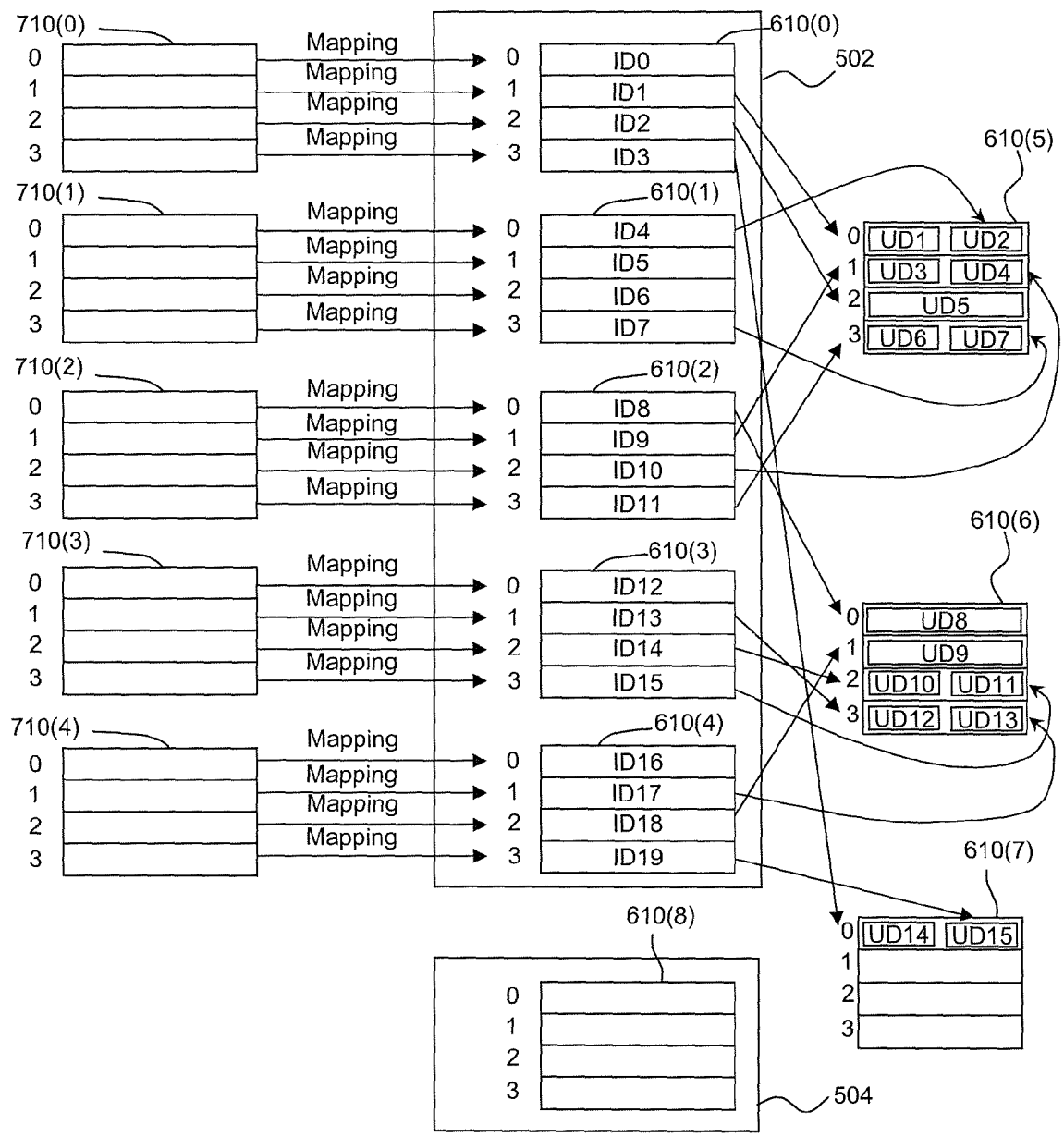
FIGS. 6J and 6K are diagrams illustrating examples of writing data and performing a data merging process according to the first exemplary embodiment of the present invention.
Figure 6K:
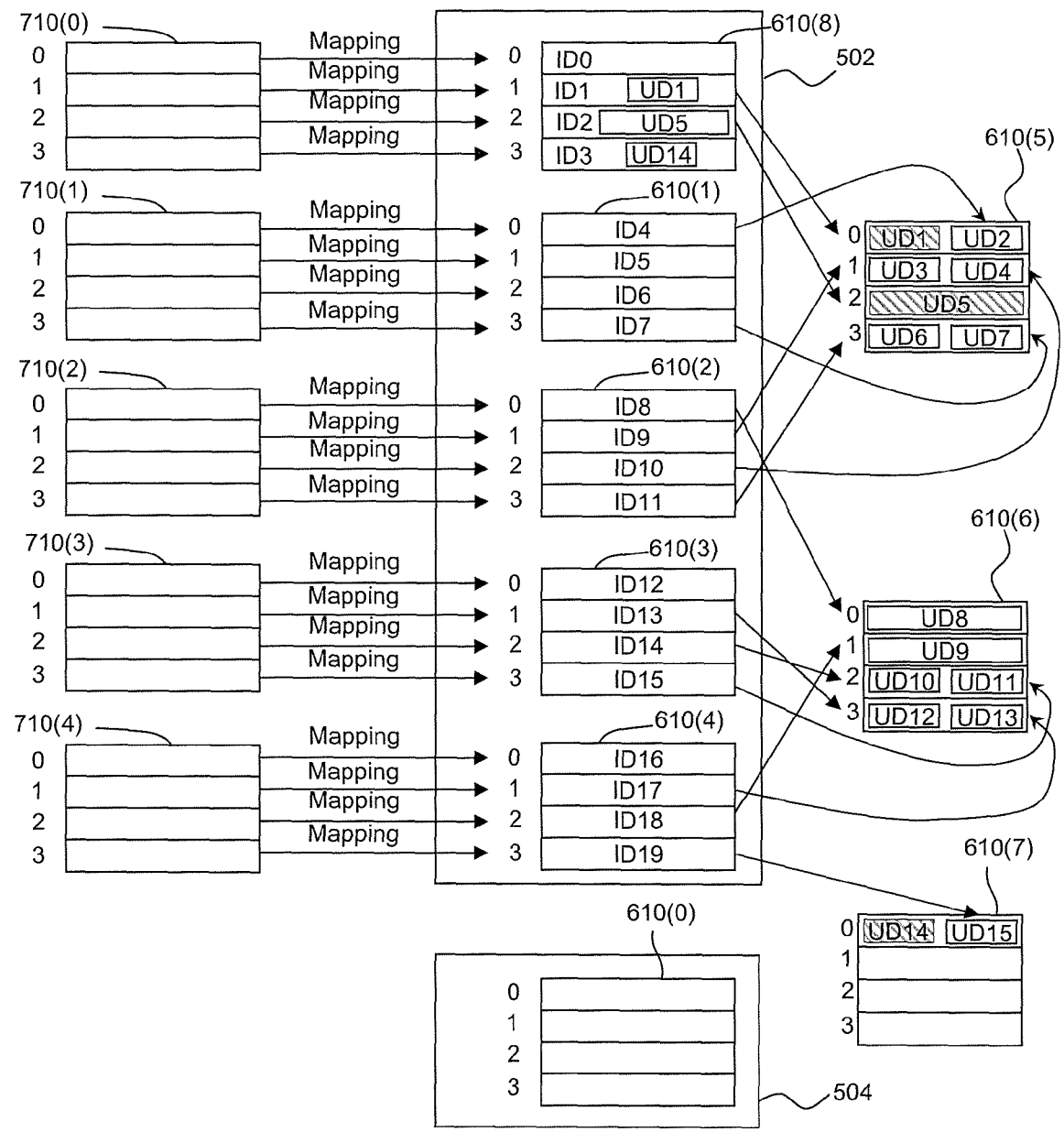

FIGS. 6J and 6K are diagrams illustrating examples of writing data and performing a data merging process according to the first exemplary embodiment of the present invention.

Referring to FIG. 6J, following FIG. 6I, the memory management circuit 202 further updates portions of the data of the 3 logical page of the logical unit 710(0) and the 3 logical page of the logical unit 710(4). The update data of the 3 logical page of the logical unit 710(0) is UD14, and the update data of the 3 logical page of the logical unit 710(4) is UD15. Since the second global random physical unit 610(6) is full, the memory management circuit 202 gets the physical unit 610(7) from the free area 504 to be a third global random physical unit and issues a programming command to write the update data UD14 and UD15 into the 0 physical page of the physical unit 610(7) simultaneously. In particular, when the amount of the global random physical units gets to 3, the memory management circuit 202 will perform a data merging process after performing the writing operation shown in FIG. 6J. Namely, in the example, when executing the writing command, the memory management circuit 202 also performs a data merging process.

Referring to FIG. 6K, when assuming the memory management circuit 202 chooses the logical unit 710(0) to perform the data merging process, the memory management circuit 202 will identify that the logical unit 710(0) maps the physical unit 610(0), get the physical unit 610(8) from the free area 504, and copy the valid data belonging to the logical unit 710(0) among the physical unit 610(0) and the global random physical units into the physical unit 610(8). To be specific, the memory management circuit 202 will sequentially write the data ID0 in the physical unit 610(0) into the 0 physical page of the physical unit 610(8). Then, the memory management circuit 202 simultaneously writes the update data UD1 in the physical unit 610(5) and the un-updated data in the 1 physical page of the physical unit 610(0) (i.e. the rest data of the data ID1, which is not updated by the update data UD1) into the 1 physical page of the physical unit 610(8). Moreover, the memory management circuit 202 simultaneously writes the update data UD5 in the physical unit 610(5) and the un-updated data in the 2 physical page of the physical unit 610(0) (i.e. the rest data of the data ID2, which is not updated by the update data UD5) into the 2 physical page of the physical unit 610(8). Furthermore, the memory management circuit 202 further simultaneously writes the update data UD14 in the physical unit 610(7) and the un-updated data in the 3 physical page of the physical unit 610(0) (i.e. the rest data of the data ID3, which is not updated by the update data UD14) into the 3 physical page of the physical unit 610(8). The memory management circuit 202 further marks the spaces for storing the update data UD1, UD5 and UD14 in the physical units 610(5) and 610(7) as invalid (shown with slanted lines). Then, the memory management circuit 202 will perform an erasing operation on the physical unit 610(0), re-map the logical unit 710(0) to the physical unit 610(8) in the logical unit-physical unit mapping table, and associate the physical unit 610(0) with the free area 504.

For example, when performing the next writing command, the memory management circuit 202 will perform a data merging process on the logical unit 710(1), and then when performing the next writing command, the memory management circuit 202 will perform a data merging process on the logical unit 710(2). Thus, when the storage space of the physical unit 610(7) is being filled, the data in the physical unit 610(5) will become invalid data. Accordingly, the memory management circuit 202 can perform an erasing operation on the physical unit 610(5), and when the physical unit 610(5) is erased, the erased physical unit 610(5) is associated with the free area 504.

Thus, according to the aforementioned operation, the memory management circuit 202 can continue to associate the physical unit stored invalid data with the free area 504, and get a physical unit regarded as a global random physical unit from the free area 504.

Figure 7:
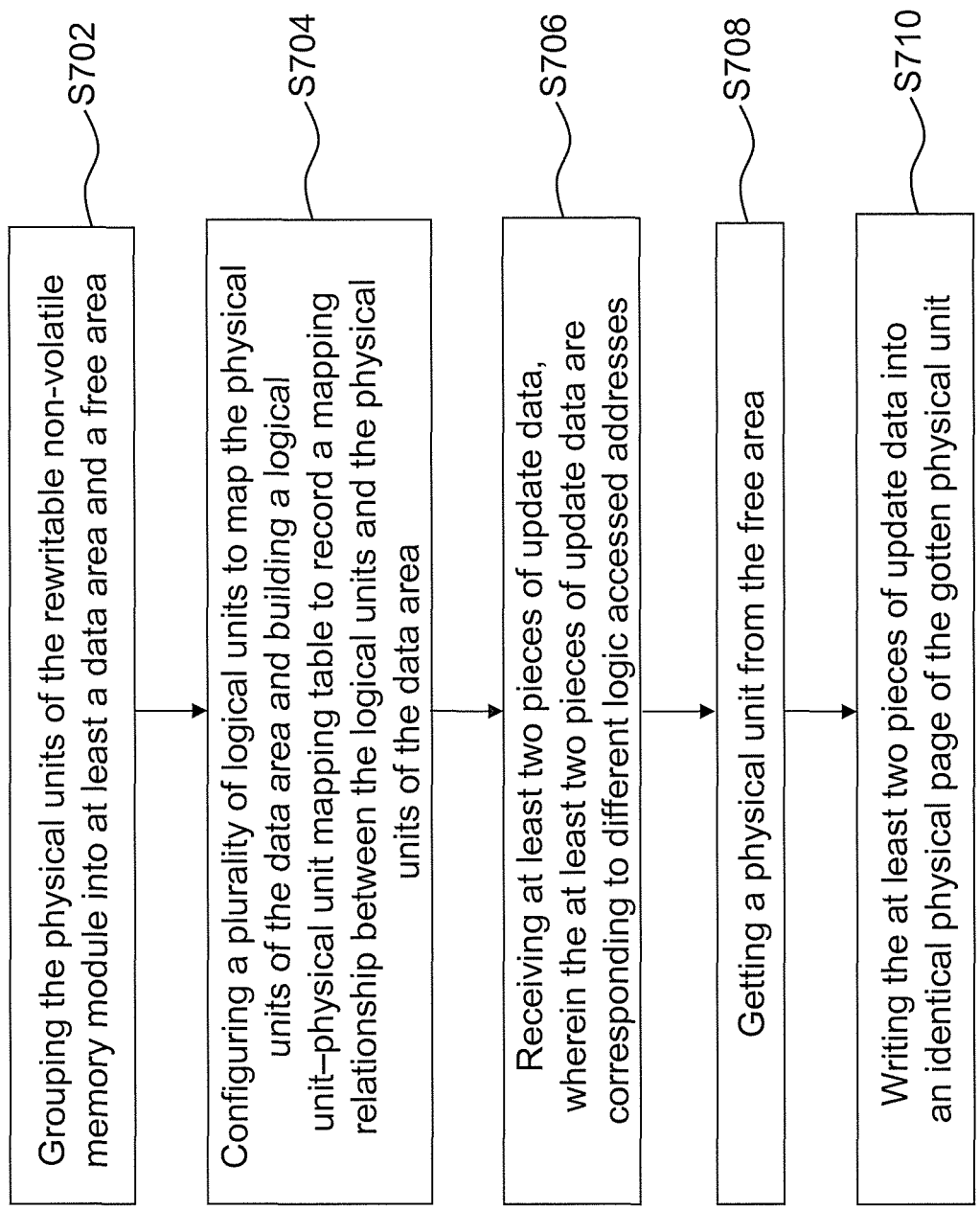
FIG. 7 is a flowchart of a data management method according to the first exemplary embodiment of the present invention.

FIG. 7 is a flowchart of a data management method according to the first exemplary embodiment of the present invention.

Referring to FIG. 7, in step S702, the memory management circuit 202 groups the physical units of the rewritable non-volatile memory module 106 into at least a data area 502 and a free area 504. Then, in step S704, the memory management circuit 202 configures a plurality of logical units to map the physical units of the data area 502 and builds a logical unit-physical unit mapping table to record a mapping relationship between the logical units and the physical units of the data area 502. Then, in step S706, the memory management circuit 202 receives at least two pieces of update data, wherein the at least two pieces of update data are corresponding to different logical access addresses. Moreover, the received at least two pieces of update data are, for example, temporarily stored in the buffer memory 252. Then, in step S708, the memory management circuit 202 gets a physical unit from the free area 504. The gotten physical unit may serve as, for example, a global random physical unit. The, in step S710, the memory management circuit 202 writes the at least two pieces of update data stored in the buffer memory 252 into an identical physical page of the gotten physical unit.

In the first exemplary embodiment of the present invention, the data structure of the physical page 430 is shown in FIG. 4B. The at least two pieces of update data are written into the data bit area 480 of the same one of the physical pages 430, and the logical access addresses corresponding to the at least two pieces of update data are written into the redundant bit area 490 of the same one of physical pages 430. Moreover, in an exemplary embodiment of the present invention, the offsets and the masks of the at least two pieces of update data are also written into the redundant bit area 490 of the same one of physical pages 430. In detail, the offset indicates a distance between a start address of the updated sector relative to a logical access address of the logical page, and the mask indicates which sectors are updated starting from a start address of the updated sector. Therefore, the memory management circuit 202 can determines which portion of the logical page has been updated according to the corresponding logical access address, the corresponding offset and the corresponding mask stored in the redundant bit area 490.

Second Exemplary Embodiment

A memory storage apparatus and a host system in the second exemplary embodiment essentially are similar to the memory storage apparatus and the host system in the first exemplary embodiment, wherein the difference is the data structure of the physical page 430 in the second exemplary embodiment is shown in FIG. 4C. Each of the physical pages 430 is divided into a first record area 432 and a second record area 434. Each of the first record area 432 and the second record area 434 is capable of storing data of 4 kilobytes. The data stored in first record area 432 and the second record area 434 of the same physical page 430 could be corresponding to either the same one logical page or two different logical pages. The data corresponding to two different logical pages could be written into the same one physical page 430. In detail, the at least two pieces of update data are written into the first record area 432 and the second record area 434 respectively, wherein the first record area 432 is used to record a first piece of the update data, and the second record area 434 is used to record a second piece of the update data. Moreover, the first record area 432 and the second record area 434 are respectively used to record the logical access addresses, offsets and masks corresponding to the first piece of the update data and the second piece of the update data, such that the memory management circuit 202 can determine which portions of the logical pages, which are corresponding to the first piece and the second piece of update data, have been updated according to the logical access addresses, offsets and masks recorded in the first record area 432 and the second record area 434. Moreover, in an exemplary embodiment of the present invention, the first piece of the update data and the second piece of the update data are respectively recorded in the first record area 432 and the second record area 434, the logical access addresses respectively corresponding to the first piece and the second piece of update data are recorded in the first record area 432, and the second record area 434 is not used to record the logical access address corresponding to the second piece of the update data.

Third Exemplary Embodiment

A memory storage apparatus and a host system in the third exemplary embodiment essentially are similar to the memory storage apparatus and the host system in the first exemplary embodiment, wherein the difference is the data structure of the physical page 430 in the third exemplary embodiment is shown in FIG. 4D. Each of the physical pages 430 is divided into a first record area 440, a second record area 450, a third record area 460 and a fourth record area 470. Each of the first record area 440, the second record area 450, the third record area 460 and the fourth record area 470 has a corresponding data bit area 480' and a corresponding redundant bit area 490'. In the present exemplary embodiment, the first record area 440 and the second record area 450 are used to record a first piece of the update data, and the third record area 460 and the fourth record area 470 are used to record a second piece of the update data. The redundant bit areas 490' of the first record area 440, the second record area 450, the third record area 460 and the fourth record area 470 are used to record the ECC code. Moreover, the redundant bit areas 490' of the first record area 440, the second record area 450, the third record area 460 and the fourth record area 470 further respectively store the system data of 8 bytes (8B), 2 bytes (2B), 2 bytes (2B) and 2 bytes (2B), as shown in FIG. 4D. Moreover, in the present exemplary embodiment, the logical access address corresponding to each piece of the update data could be represented by 4 bytes (4B), and either the offset or the mask corresponding to each piece of the update data could be represented by 1 byte (1B). The a logical access address corresponding to the first piece of update data is recorded in the redundant bit area 490' of the first record area 440, a first part (e.g. the front two bytes) of a logical access address corresponding to the second piece of update data is recorded in the redundant bit area 490' of the second record area 450, a second part (e.g. the rear two bytes) of the logical access address corresponding to the second piece of update data is recorded in the redundant bit area 490' of the third record area 460. Additionally, the redundant bit area 490' of the first record area 440 further records the offset and the mask of the first piece of update data, and the redundant bit area 490' of the fourth record area 470 further records the offset and the mask of the second piece of update data. Therefore, the memory management circuit 202 can determines which portions of the logical pages has been updated according to the corresponding logical access addresses, the corresponding offsets and the corresponding masks stored in the redundant bit areas 490'. It should be noted that the configuration of the redundant bit areas 490' of the physical page 430 for storing the logical access addresses, the offsets and the masks of the at least two pieces of update data is not limited thereto, and could be adjusted according to the specific demand.

In summary, the exemplary embodiments of the present invention are capable of writing two pieces of data corresponding to different logical access addresses into an identical physical page, such that the use efficiency of capacity of the physical units could be improved. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data management method, for managing data written into a rewritable non-volatile memory module by a host system, wherein the rewritable non-volatile memory module includes a plurality of physical units, and each of the physical units includes a plurality of physical pages, the data management method comprises:
   receiving at least two pieces of update data corresponding to different logical access addresses among a plurality of logical access addresses from the host system, wherein the at least two pieces of update data are corresponding to different logical pages among a plurality of logical pages;
   getting a physical unit from the physical units; and
   writing the at least two pieces of update data into an identical physical page of the gotten physical unit,
   wherein a size of each of the two pieces of update data is not greater than 4 kilobytes.

2. The data management method as claimed in claim 1, wherein the size of each of the two pieces of update data is 4 kilobytes.

3. The data management method as claimed in claim 2, wherein each of the two pieces of update data includes at least one error checking and correcting (ECC) frame.

4. The data management method as claimed in claim 3, wherein the different logical access addresses are not continuous.

5. The data management method as claimed in claim 1, wherein the physical page storing the at least two pieces of update data comprises a first record area and a second record area, the first record area is used to record a first piece of the update data, and the second record area is used to record a second piece of the update data.

6. The data management method as claimed in claim 5, wherein a logical access address corresponding to the first piece of the update data and a logical access address corresponding to the second piece of the update data are recorded in the first record area.

7. A memory storage apparatus, comprising:
a connector, configured to couple to a host system;
a rewritable non-volatile memory module, having a plurality of physical units; and
a memory controller, coupled to the connector and the rewritable non-volatile memory module,
wherein the memory controller is configured to receive at least two pieces of update data corresponding to different logical access addresses among a plurality of logical access addresses from the host system, wherein the at least two pieces of update data are corresponding to different logical pages among a plurality of logical pages,
wherein the memory controller is further configured to get a physical unit from the physical units,
wherein the memory controller is further configured to write the at least two pieces of update data into an identical physical page of the gotten physical unit,
wherein a size of each of the two pieces of update data is not greater than 4 kilobytes.

8. The memory storage apparatus as claimed in claim 7, wherein the size of each of the two pieces of update data is 4 kilobytes.

9. The memory storage apparatus as claimed in claim 8, wherein each of the two pieces of update data includes at least one error checking and correcting (ECC) frame.

10. The memory storage apparatus as claimed in claim 9, wherein the different logical access addresses are not continuous.

11. The memory storage apparatus as claimed in claim 7, wherein the physical page storing the at least two pieces of update data comprises a first record area and a second record area, the first record area is used to record a first piece of the update data, and the second record area is used to record a second piece of the update data.

12. The memory storage apparatus as claimed in claim 11, wherein a logical access address corresponding to the first piece of the update data and a logical access address corresponding to the second piece of the update data are recorded in the first record area.

13. A data management method, for managing data written into a rewritable non-volatile memory module by a host system, wherein the rewritable non-volatile memory module includes a plurality of physical units, and each of the physical units includes a plurality of physical pages, the data management method comprises:

receiving a first update data corresponding to a first logical access address among a plurality of logical addresses from the host system;
receiving a second update data corresponding to a second logical access address among the plurality of logical access addresses from the host system;
getting a physical unit from the physical units; and
writing the first update data and the second update data into an identical physical page of the gotten physical unit,
wherein the first logical access address and the second logical access are different logical access address, and the first logical access address and the second logical access address are corresponding to different logical pages among a plurality of logical pages.

14. The data management method as claimed in claim 13, wherein the first update data or the second update data is an unit of writing data from the host system.

15. The data management method as claimed in claim 14, wherein the unit of writing data is not greater than 4 kilobytes.

16. The data management method as claimed in claim 15, wherein the unit of writing data is equal to 4 kilobytes.

17. A memory storage apparatus, comprising:
a connector, configured to couple to a host system;
a rewritable non-volatile memory module, having a plurality of physical units; and
a memory controller, coupled to the connector and the rewritable non-volatile memory module,
wherein the memory controller is configured to receive a first update data corresponding to a first logical access address among a plurality of logical addresses from the host system and receive a second update data corresponding to a second logical access address among the plurality of logical access addresses from the host system,
the memory controller is further configured to get a physical unit from the physical units and write the first update data and the second update data into an identical physical page of the gotten physical unit,
wherein the first logical access address and the second logical access are different logical access address, and the first logical access address and the second logical access address are corresponding to different logical pages among a plurality of logical pages.

18. The memory storage apparatus as claimed in claim 17, wherein the first update data or the second update data is an unit of writing data from the host system.

19. The memory storage apparatus as claimed in claim 18, wherein the unit of writing data is not greater than 4 kilobytes.

20. The memory storage apparatus as claimed in claim 19, wherein the unit of writing data is equal to 4 kilobytes.

* * * * *